(12) United States Patent
Kobayashi

(10) Patent No.: US 12,088,237 B2
(45) Date of Patent: Sep. 10, 2024

(54) TRESTLE

(71) Applicant: E-Soltech, LLC, Aichi (JP)

(72) Inventor: Shuichi Kobayashi, Aichi (JP)

(73) Assignee: E-SOLTECH, LLC, Aichi (JP)

(*) Notice: Subject to any disclaimer, the term of this patent is extended or adjusted under 35 U.S.C. 154(b) by 0 days.

(21) Appl. No.: 18/080,943

(22) Filed: Dec. 14, 2022

(65) Prior Publication Data
US 2024/0014771 A1 Jan. 11, 2024

(30) Foreign Application Priority Data

Jul. 11, 2022 (JP) .................................. 2022-111053
Sep. 9, 2022 (JP) .................................. 2022-143448

(51) Int. Cl.
| | |
|---|---|
| *H02S 20/23* | (2014.01) |
| *F24S 25/617* | (2018.01) |
| *H02S 20/30* | (2014.01) |
| *F24S 25/60* | (2018.01) |

(52) U.S. Cl.
CPC ............ *H02S 20/23* (2014.12); *F24S 25/617* (2018.05); *H02S 20/30* (2014.12); *F24S 2025/6005* (2018.05); *F24S 2025/6006* (2018.05)

(58) Field of Classification Search
USPC ................................................ 136/243–265
See application file for complete search history.

(56) References Cited

U.S. PATENT DOCUMENTS

| | | | | |
|---|---|---|---|---|
| 2003/0070368 A1* | 4/2003 | Shingleton | ............... | F24S 25/33 52/173.3 |
| 2009/0250580 A1* | 10/2009 | Strizki | ..................... | F24S 25/35 248/309.1 |
| 2012/0275844 A1* | 11/2012 | Kobayashi | ............ | F24S 25/636 403/7 |
| 2016/0032590 A1* | 2/2016 | Shevlin | ................... | E04D 5/144 52/506.05 |
| 2018/0342974 A1* | 11/2018 | Jasmin | .................. | F24S 25/636 |
| 2020/0252023 A1* | 8/2020 | Stearns | ................... | H02S 30/10 |
| 2020/0309184 A1* | 10/2020 | Schuit | ..................... | F24S 25/30 |
| 2022/0239247 A1* | 7/2022 | Stephan | ................ | F24S 25/632 |

FOREIGN PATENT DOCUMENTS

JP  5863879 B2  2/2016

* cited by examiner

*Primary Examiner* — Bach T Dinh

(74) *Attorney, Agent, or Firm* — Ohlandt, Greeley & Perle, L.L.P.

(57) ABSTRACT

A trestle includes a base, a slide bracket, a fixing unit, a first fastener, and a second fastener. The fixing unit is installed on the slide bracket and fixes a solar panel that is mounted on a surface of a roof surface. A mounting surface on which the solar panel is mounted is formed on a receiving member of the fixing unit. A fixing unit main body of the fixing unit is formed capable of holding down and fixing the solar panel to the mounting surface by the second fastener, and is fixed to the receiving member. The first fastener is attached such that the fixing between the slide bracket and the fixing unit can be released while maintaining the fixing between the receiving member and the fixing unit main body by the second fastener.

16 Claims, 39 Drawing Sheets

TRESTLE

CROSS-REFERENCE TO RELATED APPLICATION

This application claims the benefit of Japanese Patent Application No. 2022-111053, filed on Jul. 11, 2022, and Japanese Patent Application No. 2022-143448, filed on Sep. 9, 2022, of which the entirety of the disclosures is incorporated by reference herein.

FIELD

This application relates to a trestle.

BACKGROUND

Japanese Patent No. 5863879 describes a roof top installation mounting bracket in which a lower slide body and an upper slide body are coupled, by a fixing bolt, to a bracket main body mounted on a roof surface of a house. Additionally, a fixing member for holding down and fixing an outer peripheral edge of a solar panel, which is the object to be mounted to the roof top installation mounting bracket, is provided on the roof top installation mounting bracket.

When using the roof top installation mounting bracket described in Japanese Patent No. 5863879 to perform installation or removal work of a solar panel to or from the roof surface of the house, when removing the fixing bolt to remove the roof top installation mounting bracket from the roof surface of the house, the solar panel must also be removed. Consequently, there is a problem with the installation and removal work efficiency of the solar panel to and from the roof surface of the house, and there is a demand for an enhancement in the work efficiency.

The present disclosure is made with the view of the above situation, and an objective of the present disclosure is to provide a trestle capable of enhancing the work efficiency when carrying out installation/removal work on a roof surface of a house.

SUMMARY

A trestle according to the present disclosure that achieves the objective described above includes:
  a base that is mounted on a roof surface of a house and on which a first groove is formed along a first direction;
  a slide member fitted in the first groove so as to be slidable in the first direction;
  a fixing unit installed on the slide member and for fixing an installation object to be installed on a surface of the roof surface;
  a first fastener for fixing the fixing unit to the slide member; and
  a second fastener attached to the fixing unit, wherein
  the fixing unit includes
    a receiving member on which a mount, on which the installation object is mounted, is formed, and
    a fixing unit main body that is formed capable of holding down and fixing the installation object to the mount by the second fastener, and that is fixed to the receiving member, and
  the first fastener is attached such that fixing between the slide member and the fixing unit can be released while maintaining the fixing between the receiving member and the fixing unit main body by the second fastener.

The first fastener may be configured from a member that attaches to the slide member and the fixing unit by being rotated around an axis.

A first fitted member, in which a tool for releasing the fixing between the slide member and the fixing unit fits, may be formed on the first fastener, and
  the first fitted member may be exposed to an outside in at least an axial direction of the first fitted member.

A hole or a notch that exposes the first fitted member to the outside may be formed on the fixing unit.

The second fastener may be configured from a member that attaches to the fixing unit by being rotated around an axis, and
  the second fastener may be provided such that the axis of the second fastener is parallel to the axis of the first fastener.

The fixing unit may include:
  a relay member that is fixed to the slide member and that is for increasing a height of the installation object with respect to the base by supporting the receiving member.

The fixing unit may include:
  a third fastener that supports the receiving member on the relay member and is configured from a member that attaches to the relay member and the receiving member by being rotated around an axis, and
  the receiving member may be provided liftable with respect to the relay member by the third fastener being rotated around the axis.

A second fitted member, in which a tool for releasing the fixing between the slide member and the fixing unit fits, may be formed on the third fastener, and
  the second fitted member may be exposed to an outside in at least an axial direction of the third fitted member.

A hole or a notch that exposes the second fitted member to the outside may be formed on the fixing unit main body.

A rotation restrictor that restricts the relay member from rotating around the axis of the third fastener with respect to the base may be formed on the relay member.

A pressure receiving surface, that receives a weight of the installation object fixed by the fixing unit, may be formed on the receiving member.

A portion of the mount of the receiving member may be formed recessed.

The base may include a pair of side walls, a first groove being formed on an inner side of the pair of side walls, and
  a pair of second grooves, in which a portion of the slide member is fit and that is formed along the first direction, may be formed on respective opposing surfaces of the pair of side walls.

A slide restrictor, that restricts sliding in the first direction of the slide member with respect to the base, may be formed on at least one of the pair of second grooves.

The slide restrictor may be a portion formed by the second grooves being crushed due to the side walls being pressed on.

The house may be a structure including an eave, and a ridge disposed upward from the eave, and
  the base may include:
    a first fastener insertion hole and a second fastener insertion hole into which a roof surface mounting fixture for mounting on the roof surface is inserted, and
    a third fastener insertion hole and a fourth fastener insertion hole into which the roof surface mounting fixture is inserted and that are provided more toward the eave in an eave-ridge direction, that is a direction from the ridge toward the eave of the house, than the first fastener insertion hole and the second fastener insertion hole, and a spacing, in a second direction orthogonal to the eave-ridge direction, between the first fastener insertion hole and the second fastener insertion hole may be formed wider than a spacing between forming positions in the second direction of the third fastener insertion hole and the fourth fastener insertion hole.

The first fastener insertion hole and the second fastener insertion hole may be formed at positions such that the first groove is provided therebetween, and the first fastener insertion hole may be formed at a position more offset in the eave-ridge direction than a forming position of the second fastener insertion hole.

The third fastener insertion hole and the fourth fastener insertion hole may be formed at positions such that the first groove is provided therebetween, and the third fastener insertion hole may be formed at a position more offset in the eave-ridge direction than the forming position of the fourth fastener insertion hole.

The trestle may further include a cover covering at least a portion of the fixing unit, wherein the house may be a structure including an eave, and a ridge disposed upward from the eave, and in the fixing unit, the cover covers an eave side in an eave-ridge direction that is a direction from the ridge to the eave of the house.

The base may include a base main body formed in a rectangular plate shape, and the house may be a structure including an eave, and a ridge disposed upward from the eave, and in the base main body, an inclined surface inclined with respect to the first direction may be formed at corners on the ridge side of the rectangular plate shape.

In the trestle according to the present disclosure, the first fastener is attached such that the fixing between the slide member and the fixing unit can be released while maintaining the fixing between the receiving member and the fixing unit main body by the second fastener. As such, in the trestle according to the present disclosure, it is possible to remove the fixing unit from the slide member while the fixing unit fixes the installation object. As a result, the trestle according to the present disclosure can enhance the work efficiency when carrying out installation/removal work on a roof surface of a house.

BRIEF DESCRIPTION OF THE DRAWINGS

A more complete understanding of this application can be obtained when the following detailed description is considered in conjunction with the following drawings, in which.

DETAILED DESCRIPTION

Embodiment 1

Hereinafter, a trestle 1 according to Embodiment 1 of the present disclosure is described using the drawings. Note that, to facilitate comprehension, XYZ coordinates are set and appropriately referenced.

Figure 1:
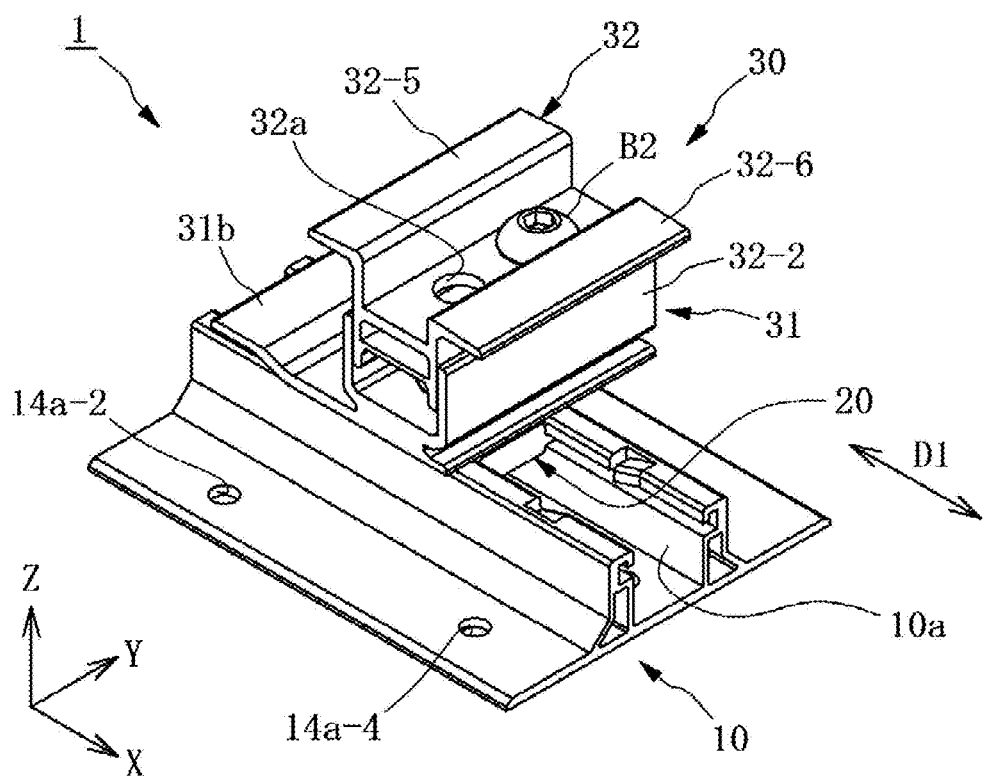
FIG. 1 is a perspective view of a trestle according to Embodiment 1 of the present disclosure.
Figure 2:
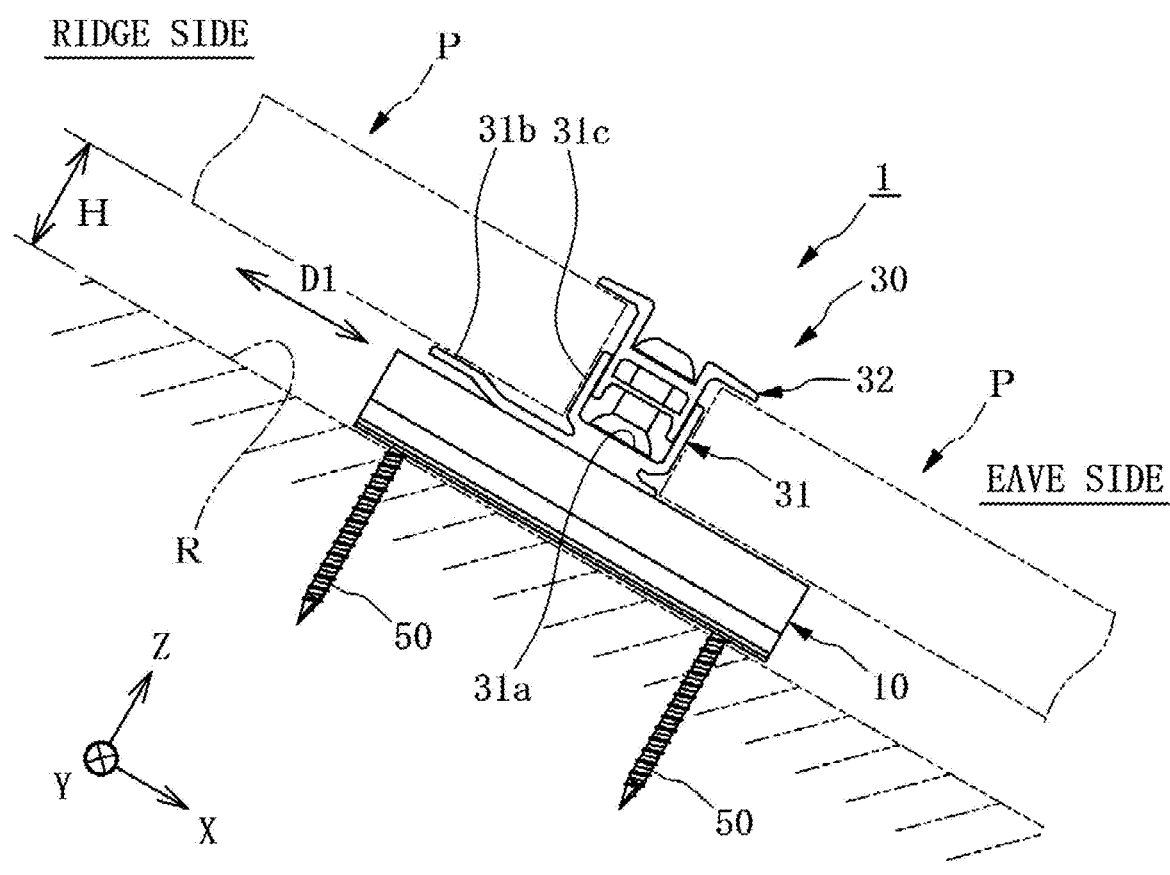
FIG. 2 is a side view of the trestle according to Embodiment 1.
Figure 3:
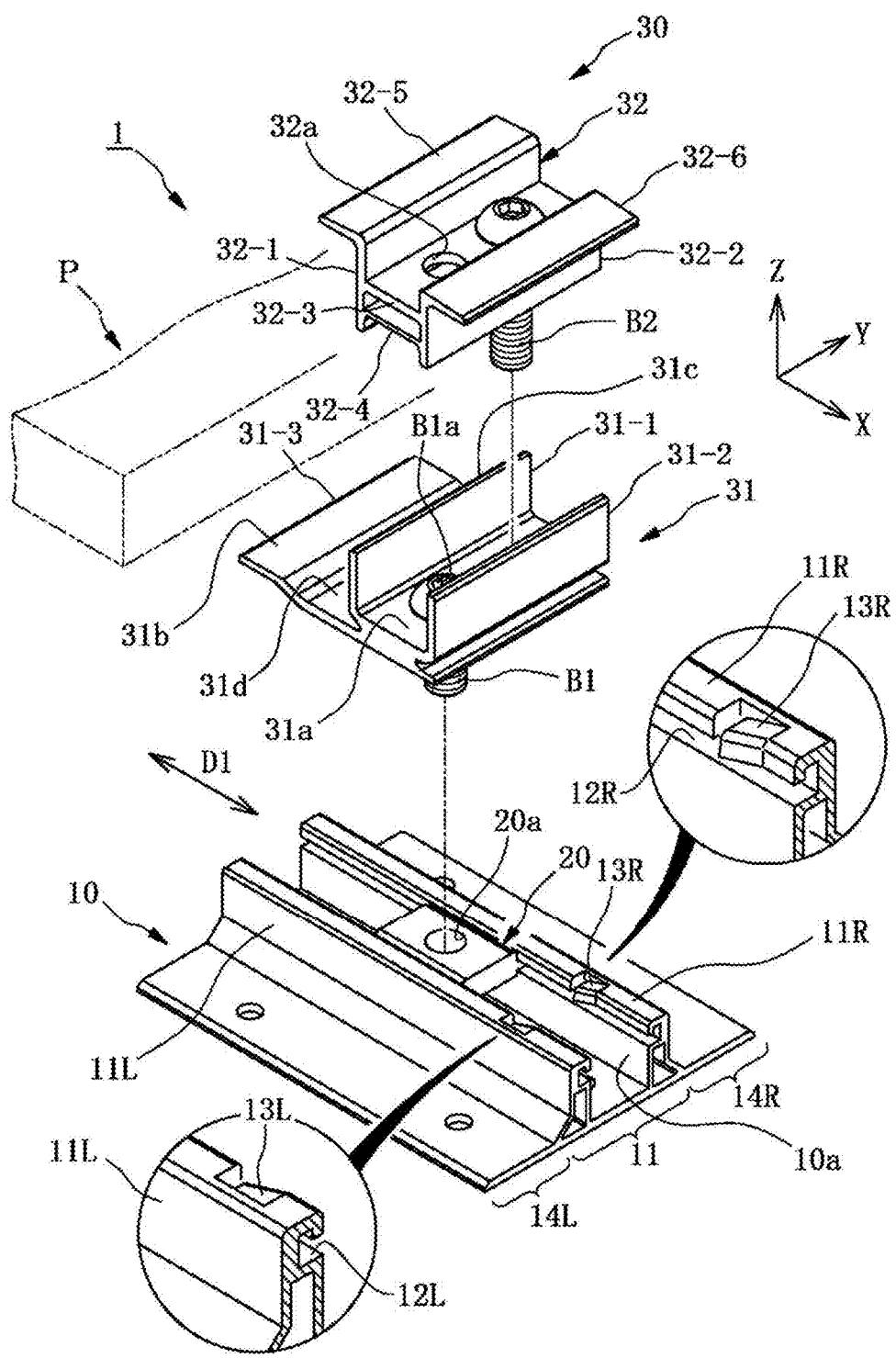
FIG. 3 is an exploded perspective view of the trestle according to Embodiment 1.
Figure 4:
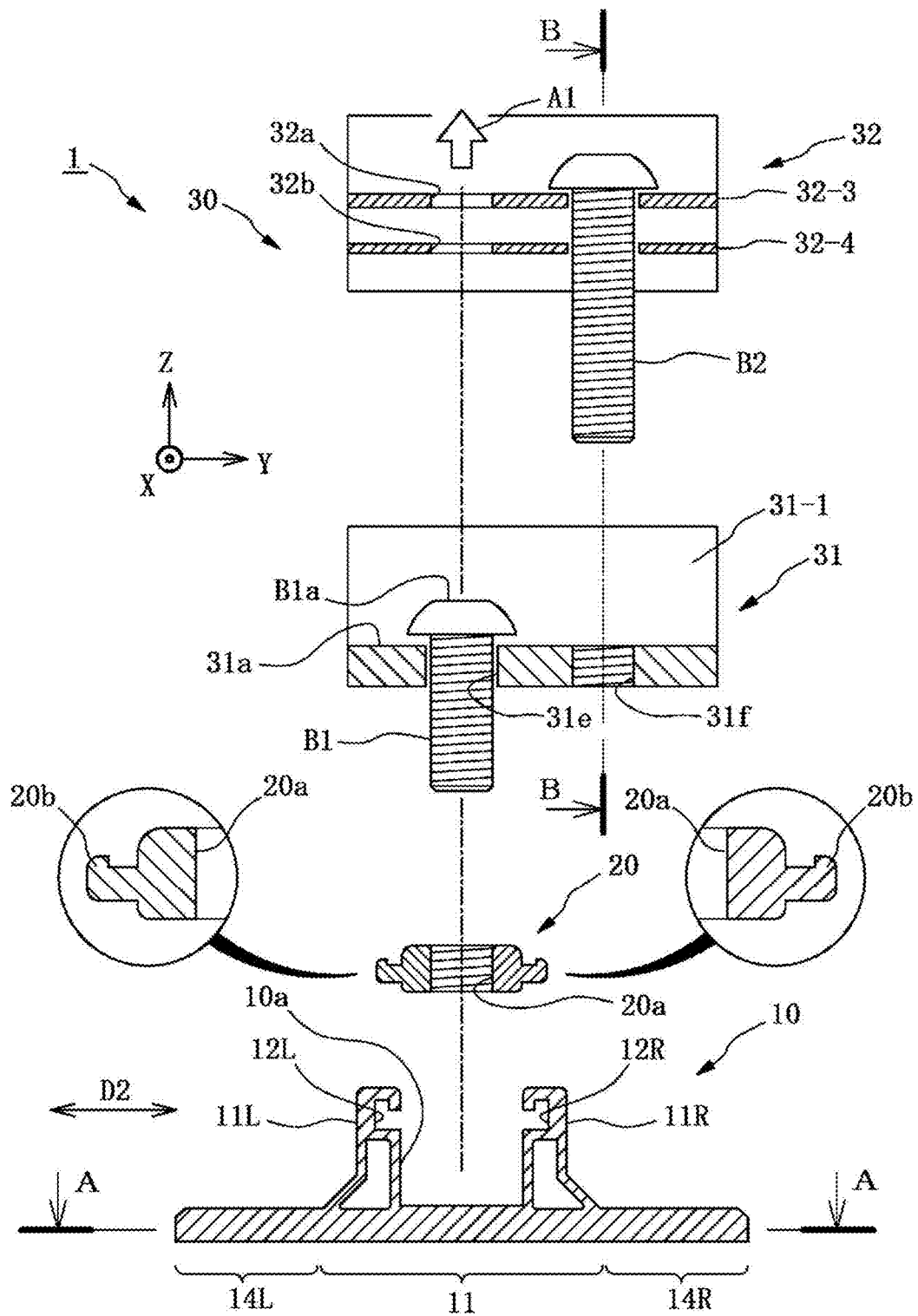
FIG. 4 is an (first) exploded cross-sectional view of the trestle according to Embodiment 1.

As illustrated in FIGS. 1 and 2, the trestle 1 is, for example, mounted on a roof surface R of a house and is used to support a solar panel P, as an installation object, installed on a surface of the roof surface R of the house. Note that, in Embodiment 1, the house on which the trestle 1 is mounted is a structure that includes eaves, and ridges upward from the eaves. The trestle 1 according to Embodiment 1 includes a base 10, a slide bracket 20 (slide member), and a fixing unit 30. Additionally, as illustrated in FIGS. 3 and 4, the trestle 1 includes a first fastener B1 and a second fastener B2.

The base 10 is a member that is mounted on the roof surface R of the house, and on which a first groove 10*a* is formed. In one example, the base 10 is formed from a metal. The base 10 includes a groove forming portion 11 where the first groove 10*a* is provided, and plate-like flange portions 14R, 14L formed projecting in the +Y direction and the −Y direction from the groove forming portion 11.

In the groove forming portion 11, the first groove 10*a* is formed along a first direction D1 that is the same direction as an X-axis direction. This groove forming portion 11 includes a pair of side walls 11R, 11L, the first groove 10*a* being formed on an inner side of the pair of side walls 11R, 11L. A pair of second grooves 12R, 12L, in which a portion of the slide bracket 20 fits, is formed on respective opposing surfaces of the pair of side walls 11R, 11L.

The second grooves 12R, 12L are formed so as to extend along the first direction (the X-axis direction), and a YZ cross-section thereof is formed in an L shape. As illustrated in FIG. 3, slide restrictors 13R, 13L are formed in the second grooves 12R, 12L. Note that, in Embodiment 1, the slide restrictors 13R, 13L are respectively formed in the second grooves 12R, 12L and, thus, two are formed. However, the present disclosure is not limited thereto. The slide restrictors 13R, 13L may be formed in one of the second grooves 12R, 12L.

The slide restrictors 13R, 13L are formed to restrict sliding, with respect to the base 10, of the slide bracket 20 in the first direction. In Embodiment 1, the slide restrictors 13R, 13L restrict sliding, with respect to the base 10, of the slide bracket 20 in the +X direction. Additionally, in Embodiment 1, the slide restrictors 13R, 13L are configured as portions that are formed by a portion of the second grooves 12R, 12L being crushed due to the side walls 11R, 11L being pressed on by a tool or the like from the +Z side. However, the present disclosure is not limited thereto. The slide restrictors 13R, 13L may be formed by a method other than the method in which the side walls 11R, 11L are pressed on by a tool or the like from the +Z side.

Fastener insertion holes 14*a*-1 to 14*a*-4 are formed, penetrating in a Z-axis direction, on the flange portions 14R, 14L.

The fastener insertion holes 14*a*-1 to 14*a*-4 are round holes into which roof surface mounting fixtures 50 (see FIG. 2) are inserted. Of the four fastener insertion holes 14*a*-1 to 14*a*-4, the fastener insertion holes 14*a*-3 and 14*a*-4 are provided more toward the eave side (downward, toward the +X side) in an eave-ridge direction than the fastener insertion holes 14*a*-1 and 14*a*-2. Here, the eave-ridge direction is a direction from the ridges toward the eaves of the house. Note that, in Embodiment 1, the eave-ridge direction is the same direction as the first direction D1.

Figure 5:
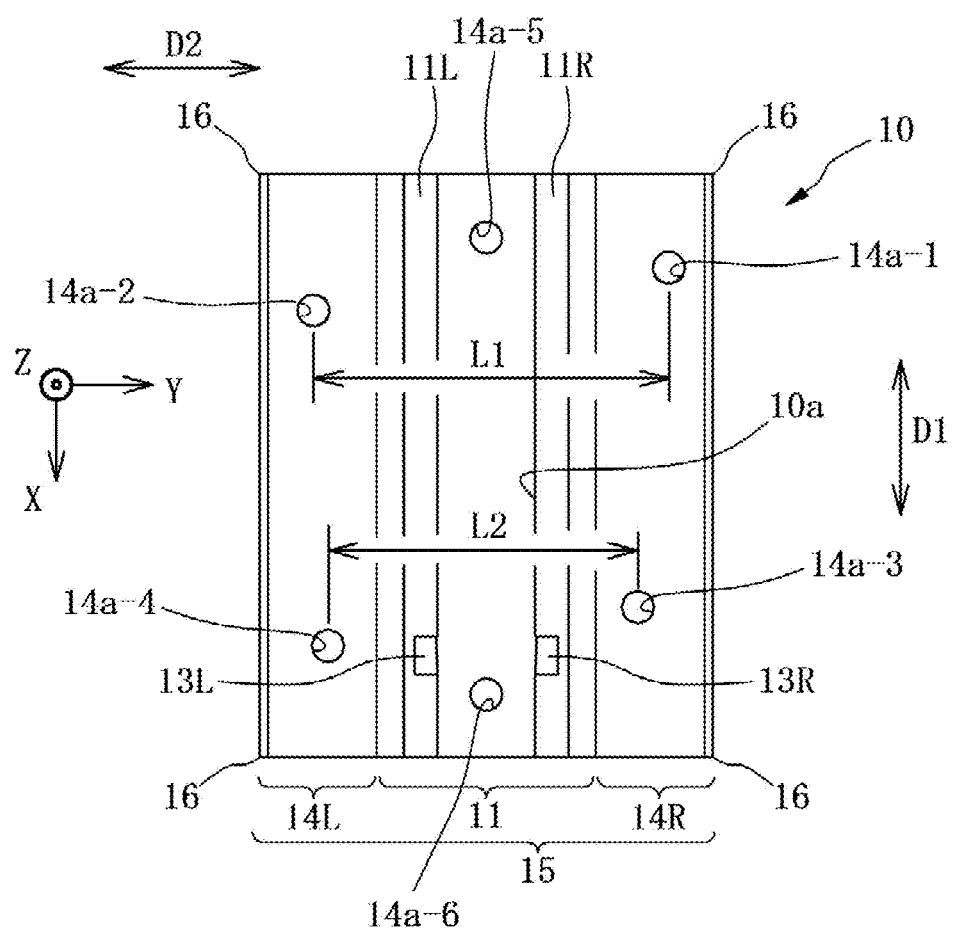
FIG. 5 is a plan view of a base according to Embodiment 1.
Figure 6:
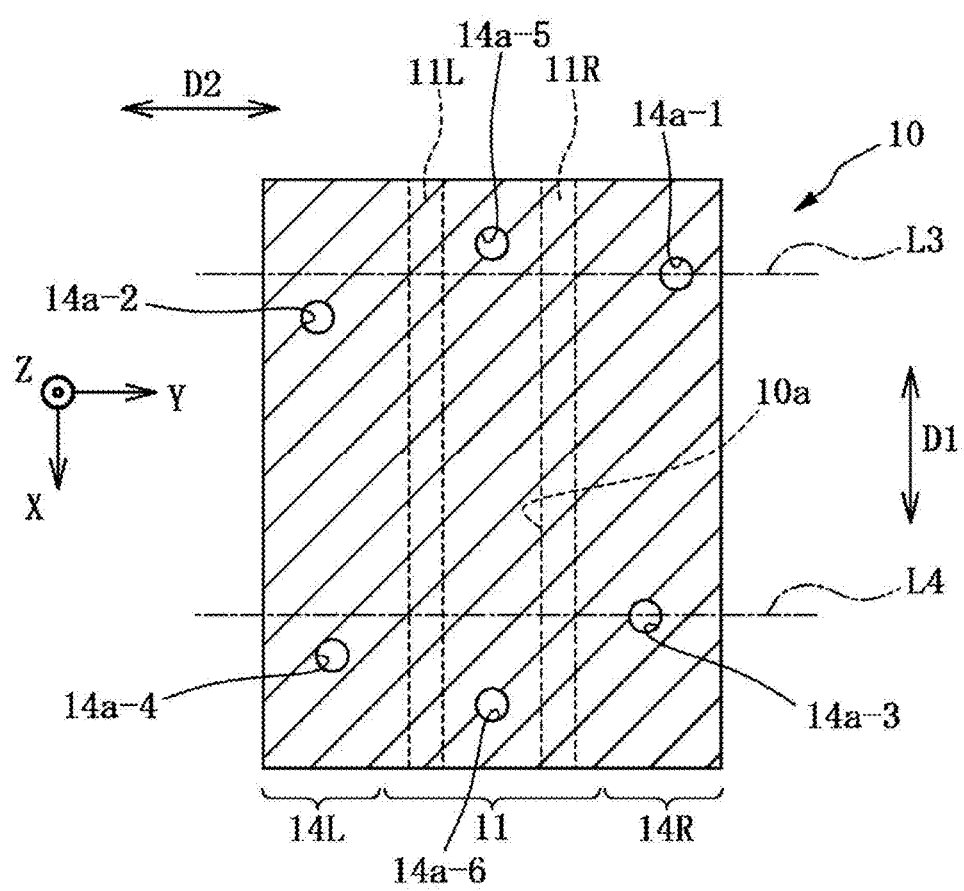
FIG. 6 is a cross-sectional view taken along line A-A of FIG. 4.

As illustrated in FIG. 5, in a planar view from the +Z side (above), a spacing L1 in a second direction D2, orthogonal to the eave-ridge direction, between the fastener insertion holes 14*a*-1 and 14*a*-2 (first fastener insertion hole and second fastener insertion hole) is formed wider than a spacing L2 between forming positions in the second direction of the fastener insertion holes 14*a*-3 and 14*a*-4 (third fastener insertion hole and fourth fastener insertion hole). Additionally, the fastener insertion holes 14*a*-1 and 14*a*-2 are formed at positions at which the first groove 10*a* is provided therebetween. Moreover, as illustrated in FIG. 6, when viewed planarly, the fastener insertion hole 14*a*-2 is formed at a position offset from a straight line L3 that passes through the center of the fastener insertion hole 14*a*-1 and that is parallel to the Y-axis direction. As a result, the fastener insertion hole 14*a*-1 is formed at a position offset more in the eave-ridge direction (the X-axis direction) than the forming position of the fastener insertion hole 14*a*-2. Specifically, in Embodiment 1, the fastener insertion hole 14*a*-2 is formed at a position more offset toward the +X side (downward) in the eave-ridge direction than the forming position of the fastener insertion hole 14*a*-1.

As with the fastener insertion holes 14*a*-1, 14*a*-2, the fastener insertion holes 14*a*-3, 14*a*-4 are formed at positions at which the first groove 10*a* is provided therebetween. Moreover, when viewed planarly, the fastener insertion hole 14*a*-4 is formed at a position offset from a straight line L4 that passes through the center of the fastener insertion hole 14*a*-3 and that is parallel to the Y-axis direction and to the straight line L3. As a result, the fastener insertion hole 14*a*-3 is formed at a position offset more in the eave-ridge direction (the X-axis direction) than the forming position of the fastener insertion hole 14*a*-4. Specifically, in Embodiment 1, the fastener insertion hole 14*a*-4 is formed at a position more offset toward the +X side (downward) in the eave-ridge direction than the forming position of the fastener insertion hole 14*a*-3.

As illustrated in FIG. 5, in addition to the fastener insertion holes 14*a*-1 to 14*a*-4, fastener insertion holes 14*a*-5, 14*a*-6 are formed on the base 10.

The fastener insertion holes 14*a*-5, 14*a*-6 are formed penetrating in the Z-axis direction, on a bottom surface of the first groove 10*a*. The fastener insertion hole 14*a*-6 is provided more toward the eave side (downward, toward the +X side) in the eave-ridge direction than the fastener insertion hole 14*a*-5.

As illustrated in FIG. 6, the fastener insertion hole 14*a*-5 is formed at a position offset more in the eave-ridge direction (the X-axis direction) than the forming positions of the fastener insertion holes 14*a*-1, 14*a*-2. More specifically, in Embodiment 1, the fastener insertion hole 14*a*-5 is formed at a position more offset toward the −X side (upward) in the eave-ridge direction than the forming positions of the fastener insertion holes 14*a*-1, 14*a*-2.

The fastener insertion hole 14*a*-6 is formed at a position offset more in the eave-ridge direction (the X-axis direction) than the forming positions of the fastener insertion holes

14*a*-3, 14*a*-4. More specifically, in Embodiment 1, the fastener insertion hole 14*a*-6 is formed at a position more offset toward the +X side (downward) in the eave-ridge direction than the forming positions of the fastener insertion holes 14*a*-3, 14*a*-4.

As illustrated in FIG. 3, the slide bracket 20 (slide member) is fitted in the first groove 10*a* of the base 10 so as to be slidable in the first direction D1. The slide bracket 20 is attached to the base 10 at a desired position in the first direction D1 to perform positioning of the solar panel P in the first direction D1. In one example, the slide bracket 20 is formed from a metal and, specifically, is formed from a metal that is the same material as the base 10. A screw hole 20*a* is formed on the slide bracket 20.

The first fastener B1 is screwed into the screw hole 20*a*, and an inner circumferential surface of the screw hole 20*a* is formed into a female screw surface. The screw hole 20*a* is formed penetrating in the Z-axis direction.

As illustrated in FIG. 4, in addition to the screw hole 20*a*, a pair of fitters 20*b* is formed on the slide bracket 20.

The fitters 20*b* are portions that fit in the second grooves 12R, 12L formed on the side walls 11R, 11L of the base 10. The fitters 20*b* are formed such that YZ cross-sections thereof are L-shaped.

As illustrated in FIG. 2, the fixing unit 30 fixes the solar panel P. As illustrated in FIGS. 3 and 4, the fixing unit 30 is installed on the slide bracket 20 by the first fastener B1. In one example, the fixing unit 30 is formed from a metal and, specifically, is formed from a metal that is the same material as the base 10 and the slide bracket 20. The fixing unit 30 includes a receiving member 31 and a fixing unit main body 32.

The receiving member 31 is a fixture that receives the fixing unit main body 32. A groove 31*a* in which the fixing unit main body 32 is fitted is formed on the receiving member 31 along the Y-axis direction. As illustrated in FIG. 4, a hole 31*e* in which the first fastener B1 is inserted and a screw hole 31*f* in which the second fastener B2 is inserted are formed penetrating in the Z-axis direction on a bottom surface of the groove 31*a*.

The hole 31*e* is a hole having an inner circumferential surface that is not formed into a female screw surface.

The screw hole 31*f* is a hole having an inner circumferential surface that is formed into a female screw surface.

Additionally, a mounting surface 31*b* (mount) and a pressure receiving surface 31*c* are formed on the receiving member 31.

Figure 7:
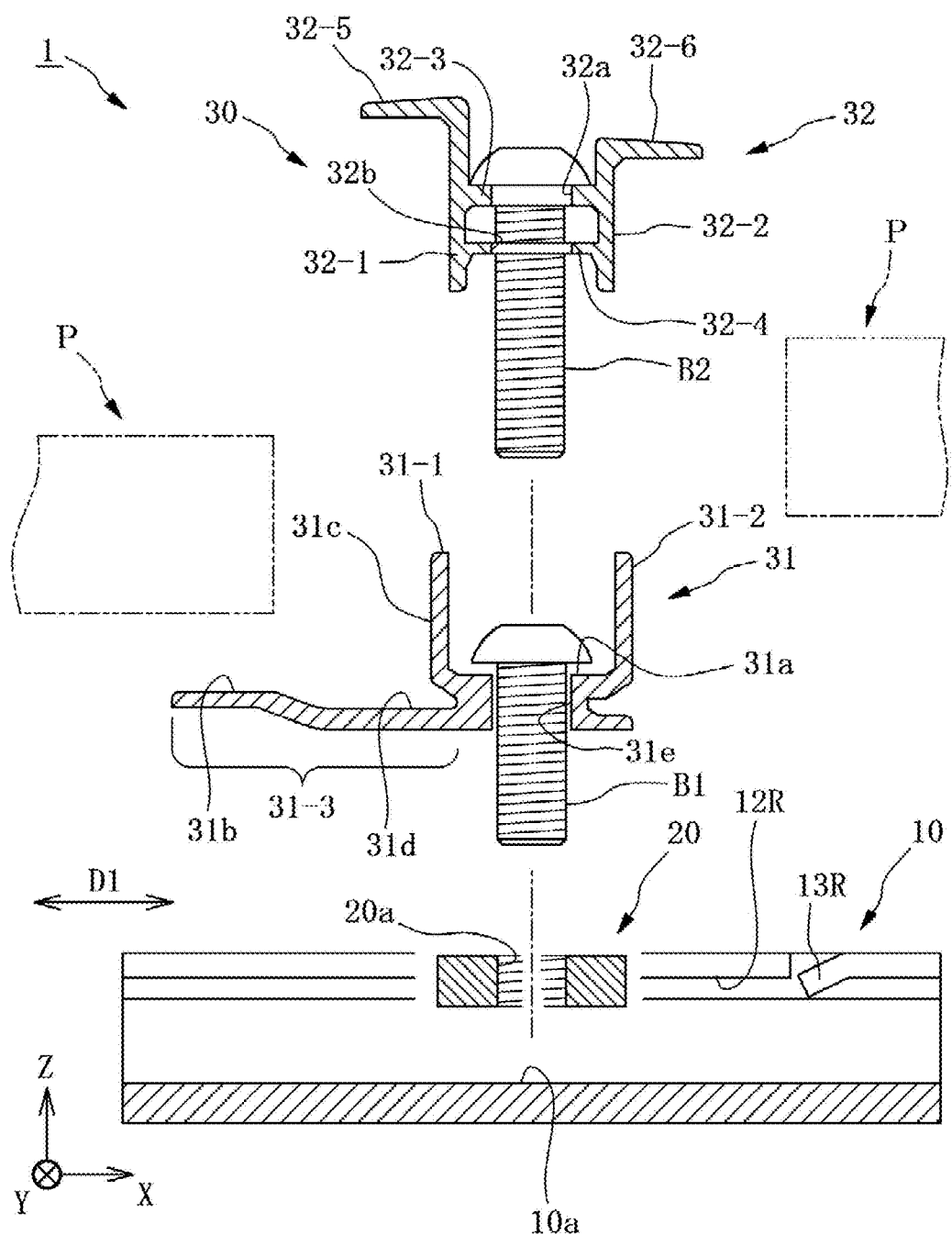
FIG. 7 is an (second) exploded cross-sectional view of the trestle according to Embodiment 1.

As illustrated in FIG. 7, the mounting surface 31*b* is provided on an upper surface (the +Z side surface) of an extension 31-3 (mount) extending from one side wall 31-1 of a pair of side walls 31-1, 31-2, the groove 31*a* being formed on the inner side of the side walls 31-1, 31-2. The solar panel P, which is the installation object of the trestle 1, is mounted on the mounting surface 31*b*. Additionally, the mounting surface 31*b* is configured from a surface roughly parallel to the XY plane, and a portion of the mounting surface 31*b* is formed recessed. The portion of the mounting surface 31*b* that is formed recessed is formed as a depression 31*d*.

The pressure receiving surface 31*c* is a surface that receives the weight of the solar panel P that is fixed by the fixing unit 30. The pressure receiving surface 31*c* is formed on the −X side surface of the side wall 31-1, and is formed on a surface parallel to the YZ plane.

As illustrated in FIG. 3, the fixing unit main body 32 is a fixture that is fixed to the receiving member 31 by the second fastener B2. The fixing unit main body 32 includes side walls 32-1, 32-2, coupling plates 32-3, 32-4, and extensions 32-5, 32-6.

The side walls 32-1, 32-2 are formed in a plate shape parallel to the YZ plane. The side wall 32-1 is provided overlapping the side wall 31-1 of the receiving member 31, with a gap between the side wall 32-1 and the side wall 31-1. The side wall 32-2 is provided overlapping the side wall 31-2 of the receiving member 31, with a gap between the side wall 32-2 and the side wall 31-2.

The coupling plates 32-3, 32-4 are formed in a plate shape parallel to the XY plane. These coupling plates 32-3, 32-4 couple the side walls 32-1, 32-2. Due to the side walls 32-1, 32-2 being coupled by the two coupling plates 32-3, 32-4, the strength of the fixing unit main body 32 is enhanced. A groove extending the Y-axis direction is formed on the inner side of the coupling plate 32-3, disposed upward (on the +Z side) from the coupling plate 32-4, and the side walls 32-1, 32-2. As illustrated in FIG. 7, a hole in which the second fastener B2 is inserted is formed on the coupling plate 32-3. Likewise, a hole in which the second fastener B2 is inserted is also formed on the coupling plate 32-4.

The extension 32-5 extends from an upper end (+Z side end) of the side wall 32-1. A lower surface of the extension 32-5 (−Z side surface) functions as a surface that holds down and fixes the solar panel P to the mounting surface 31*b*. Additionally, the extension 32-5 is formed such that a length in the extending direction (length in the X-axis direction) thereof is shorter than a length in the extending direction (length in the X-axis direction) of the extension 31-3 of the receiving member 31.

The extension 32-6 extends from an upper end (+Z side end) of the side wall 32-2 in a direction opposite the extending direction of the extension 32-5. A lower surface of the extension 32-6 (−Z side surface) functions as a surface that holds down and fixes the solar panel P.

As illustrated in FIG. 4, in the fixing unit main body 32 configured as described above, holes 32*a*, 32*b* penetrating in the Z-axis direction are respectively formed on the coupling plates 32-3, 32-4. As illustrated by arrow A1 of FIG. 4, a portion of a +Z side head of the first fastener B1 is exposed to the outside through these holes 32*a*, 32*b*. Additionally, the holes 32*a*, 32*b* are formed having a size such that the head of the first fastener B1 does not pass through in the Z-axis direction.

As illustrated in FIGS. 3 and 4, the first fastener B1 is constituted from a bolt or a screw, for example. The first fastener B1 is attached to the slide bracket 20 and the fixing unit 30 by being rotated around an axis. The first fastener B1 is attached to the slide bracket 20 and the fixing unit 30 such that the fixing between the slide bracket 20 and the fixing unit 30 can be released while maintaining the fixing between the receiving member 31 and the fixing unit main body 32 by the second fastener B2. Additionally, the first fastener B1 is attached to the slide bracket 20 and the fixing unit 30 such that a lower end of the first fastener B1 protrudes into the first groove 10*a* of the base 10.

A fitted hole B1*a* (first fitted member), in which a tool for releasing the fixing of the slide bracket 20 and the fixing unit 30 fits, is formed on the first fastener B1. The fitted hole B1*a* of the first fastener B1 is exposed to the outside in the Z-axis direction (axial direction of the first fastener B1) through the holes 32*a*, 32*b* formed on the fixing unit main body 32.

The second fastener B2 is constituted from a bolt or a screw, for example. The second fastener B2 is attached to the fixing unit 30 by being rotated around an axis. The second fastener B2 is provided such that an axis thereof is parallel to the axis of the first fastener B1. Additionally, the second fastener B2 is attached to fixing unit 30 such that a lower end of the second fastener B2 protrudes out from the groove forming portion 11 of the base 10.

Figure 8:
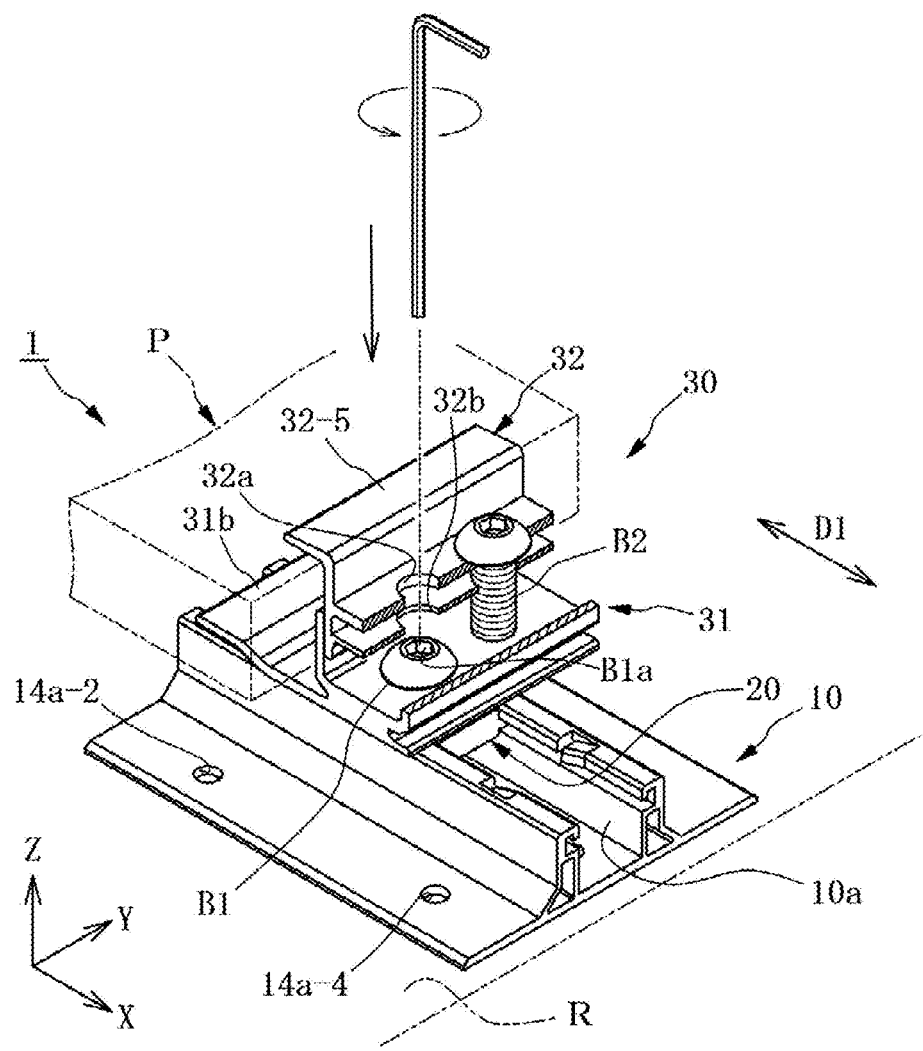
FIG. 8 is a (first) perspective view for explaining the effects of the trestle according to Embodiment 1.
Figure 9A:
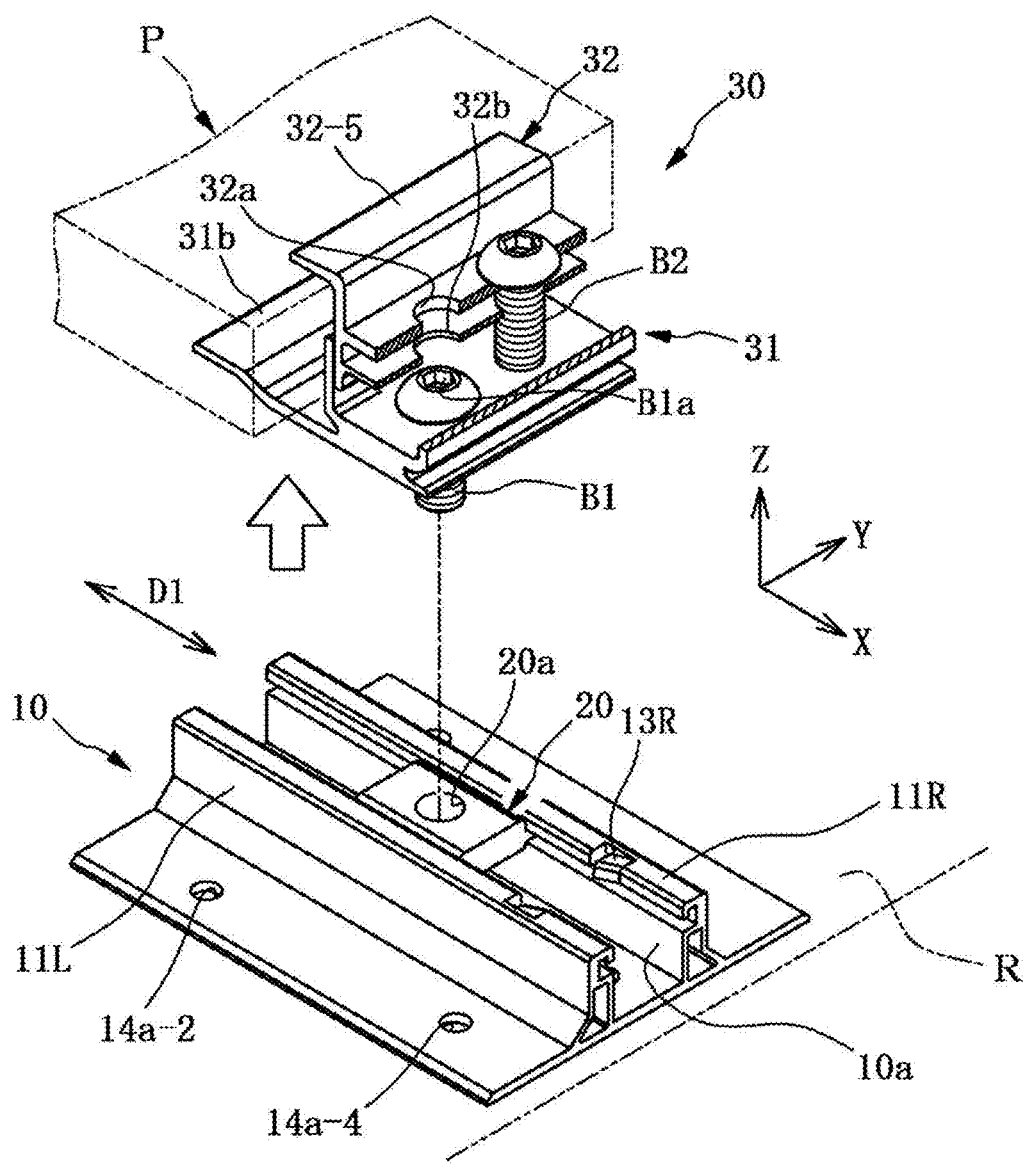
FIG. 9A is a (second) perspective view for explaining the effects of the trestle according to Embodiment 1.

As described above, with the trestle 1 according to Embodiment 1, as illustrated in FIGS. 8 and 9A, the fitted hole B1a of the first fastener B1 is exposed to the outside in the Z-axis direction through the holes 32a, 32b. The first fastener B1 is attached such that the fixing between the slide bracket 20 and the fixing unit 30 can be released while maintaining the fixing between the receiving member 31 and the fixing unit main body 32 by the second fastener B2. Thus, in the trestle 1, it is possible to remove the fixing unit 30 from the slide bracket 20 while the solar panel P is fixed by the fixing unit 30. As a result, the trestle 1 according to Embodiment 1 can enhance the work efficiency when carrying out installation/removal work on the roof surface R of the house.

Additionally, with the trestle 1 according to Embodiment 1, the holes 32a, 32b that expose the fitted hole B1a of the first fastener B1 to the outside are formed on the fixing unit main body 32. Moreover, the holes 32a, 32b are formed penetrating in the Z-axis direction. As such, it is easier for a user to fit the tool in the fitted hole B1a of the first fastener B1 by inserting the tool in the holes 32a, 32b. As a result, the trestle 1 according to Embodiment 1 can enhance the work efficiency when carrying out installation/removal work on the roof surface R of the house.

Figure 9B:
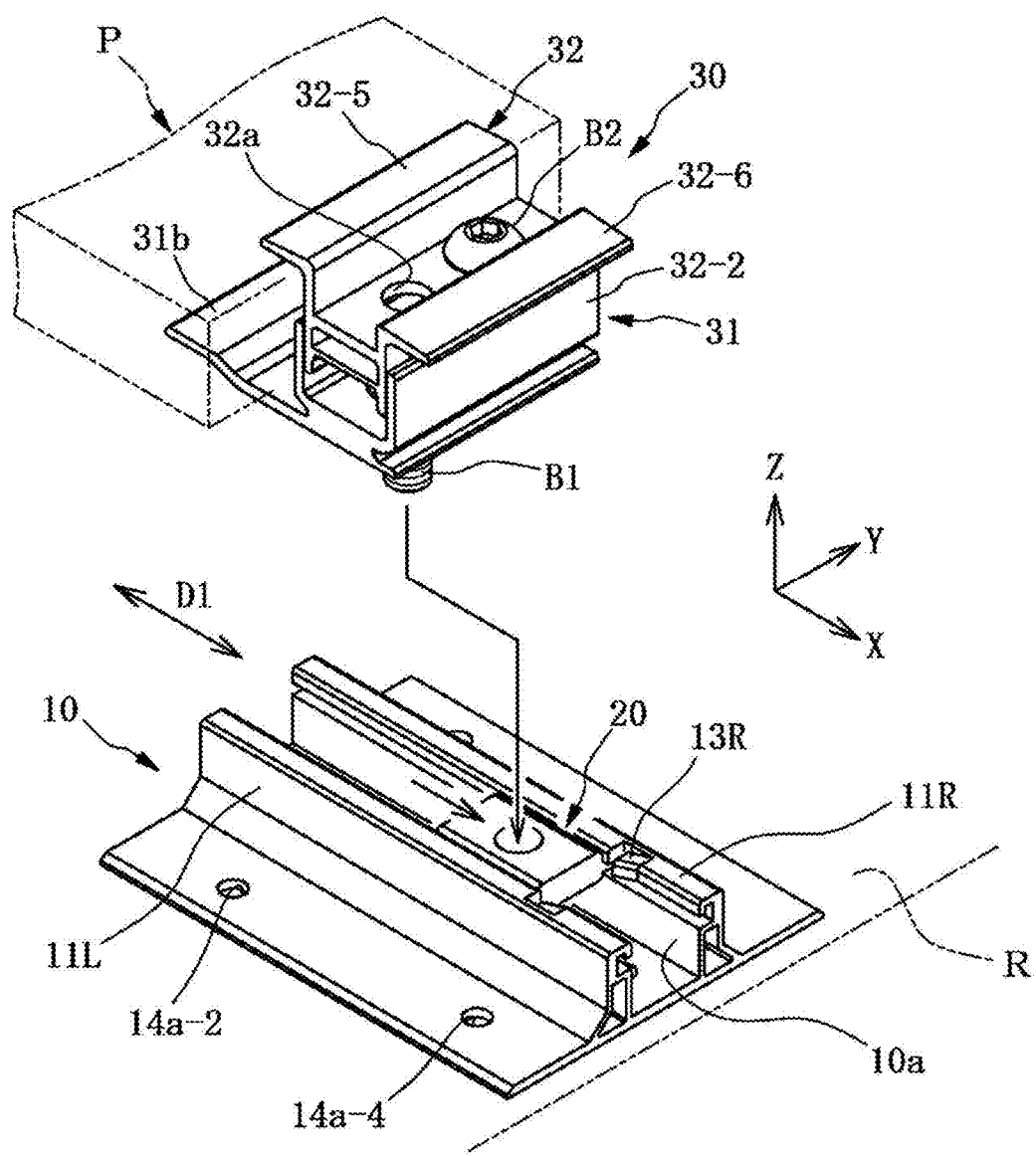
FIG. 9B is a (third) perspective view for explaining the effects of the trestle according to Embodiment 1.

Additionally, with the trestle 1 according to Embodiment 1, as illustrated in FIG. 9B, the user can perform positioning of the solar panel P in the first direction D1 by attaching the slide bracket 20 to the base 10 at a desired position in the first direction D1. Thus, the trestle 1 according to Embodiment 1 can enhance the work efficiency when carrying out installation/removal work on the roof surface R of the house.

Figure 10A:
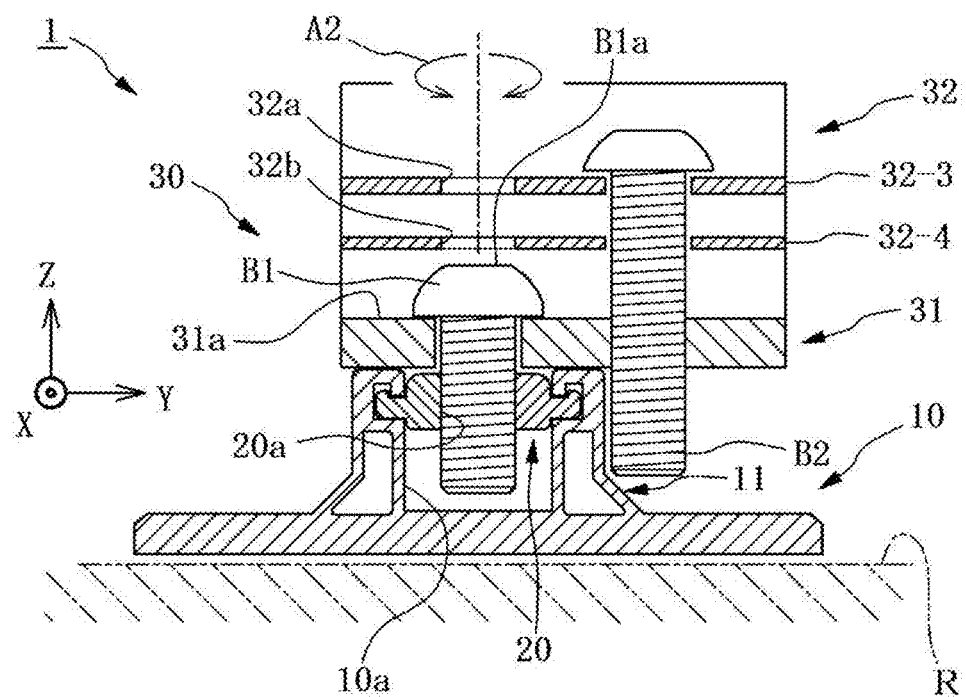
FIG. 10A is a (first) cross-sectional view for explaining the effects of the trestle according to Embodiment 1.
Figure 10B:
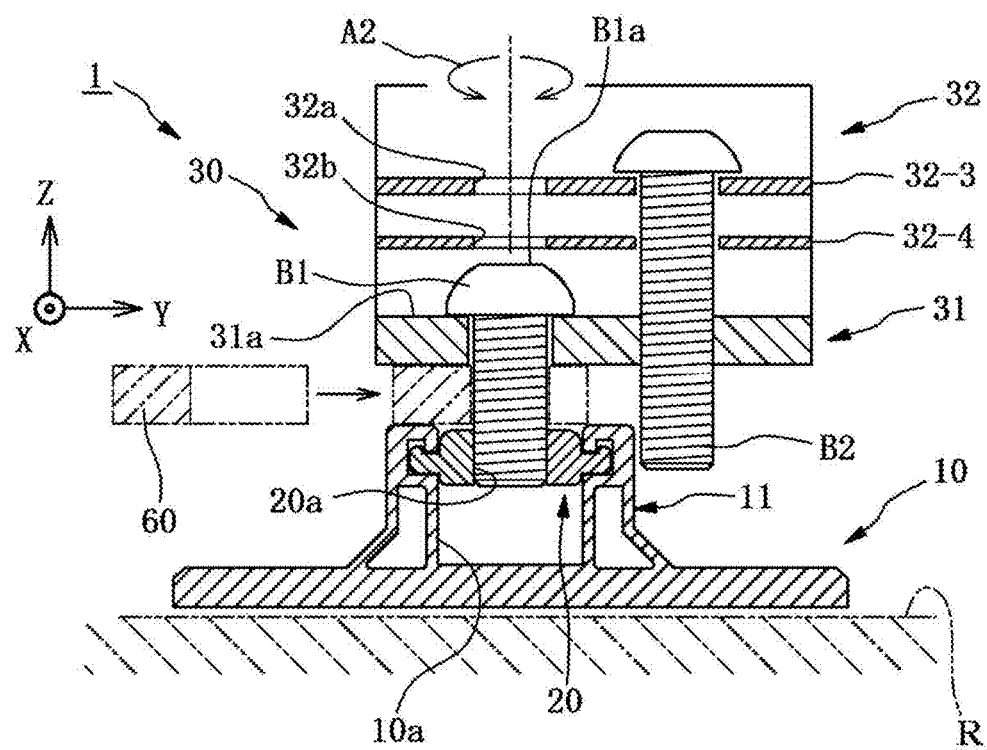
FIG. 10B is a (second) cross-sectional view for explaining the effects of the trestle according to Embodiment 1.

Additionally, with the trestle 1 according to Embodiment 1, as illustrated in FIG. 10A, the first fastener B1 is screwed into the screw hole 20a. As such, the fixing unit 30 can be fixed to the base 10 by rotating the first fastener B1 in the screw hole 20a. In Embodiment 1, when raising the height of the fixing unit 30 with respect to the base 10, as illustrated in FIG. 10B, the first fastener B1 is loosened, a fitting 60 formed in a U-shape, for example, is inserted as a spacer in the gap between the base 10 and the fixing unit 30, and the fixing unit 30 is fixed again using the first fastener B1. Thus, the trestle 1 according to Embodiment 1 can enhance the work efficiency when carrying out installation/removal work on the roof surface R of the house. Note that the shape of the fitting 60 is not limited to a U-shape. The fitting 60 may have a shape other than a U-shape, provided that the fitting 60 functions as a spacer to be inserted in the gap between the base 10 and the fixing unit 30.

Additionally, with the trestle 1 according to Embodiment 1, the second fastener B2 is attached to the fixing unit 30 such that the lower end of the second fastener B2 protrudes out from the groove forming portion 11 of the base 10. As such, as illustrated by arrow A2 of FIGS. 10A and 10B, when the fixing unit 30 is rotated around the axis of the first fastener B1 with respect to the base 10, the lower end of the second fastener B2 interferes with the groove forming portion 11 of the base 10. Due to this, the fixing unit 30 does not rotate more than a predetermined amount with respect to the base 10. Thus, the trestle 1 according to Embodiment 1 can enhance the work efficiency when carrying out installation/removal work on the roof surface R of the house.

Figure 11:
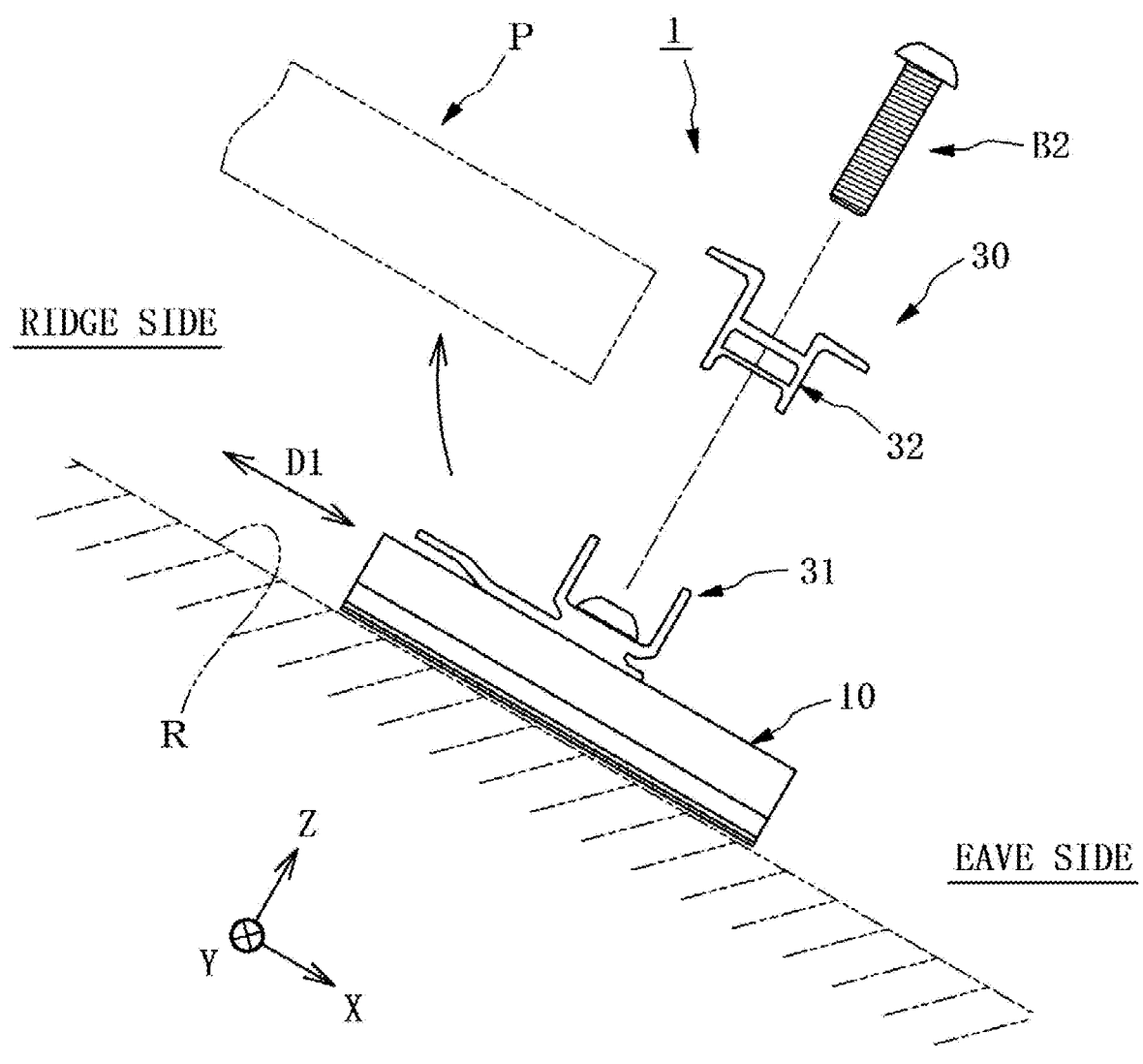
FIG. 11 is a (first) side view for explaining the effects of the trestle according to Embodiment 1.

Additionally, with the trestle 1 according to Embodiment 1, as illustrated in FIG. 2, the pressure receiving surface 31c that receives the weight of the solar panel P fixed by the fixing unit 30 is formed on the receiving member 31. Moreover, the fixing unit main body 32 is fitted into the groove 31a formed in the receiving member 31 and, as such, is formed so as not to receive the weight of the solar panel P. As such, the user can remove the receiving member 31 from the fixing unit main body 32 while the fixing unit main body 32 is attached to the base 10. For example, as illustrated in FIG. 11, the user can easily carry out installation and removal of the solar panel P when performing maintenance. Additionally, the fixing unit main body 32 is formed so as not to receive the weight of the solar panel P and, as such, adjustment of the height of the fixing unit main body 32 with respect to the receiving member 31 is facilitated. As a result, the trestle 1 according to Embodiment 1 can enhance the work efficiency when carrying out installation/removal work on the roof surface R of the house.

Figure 12:
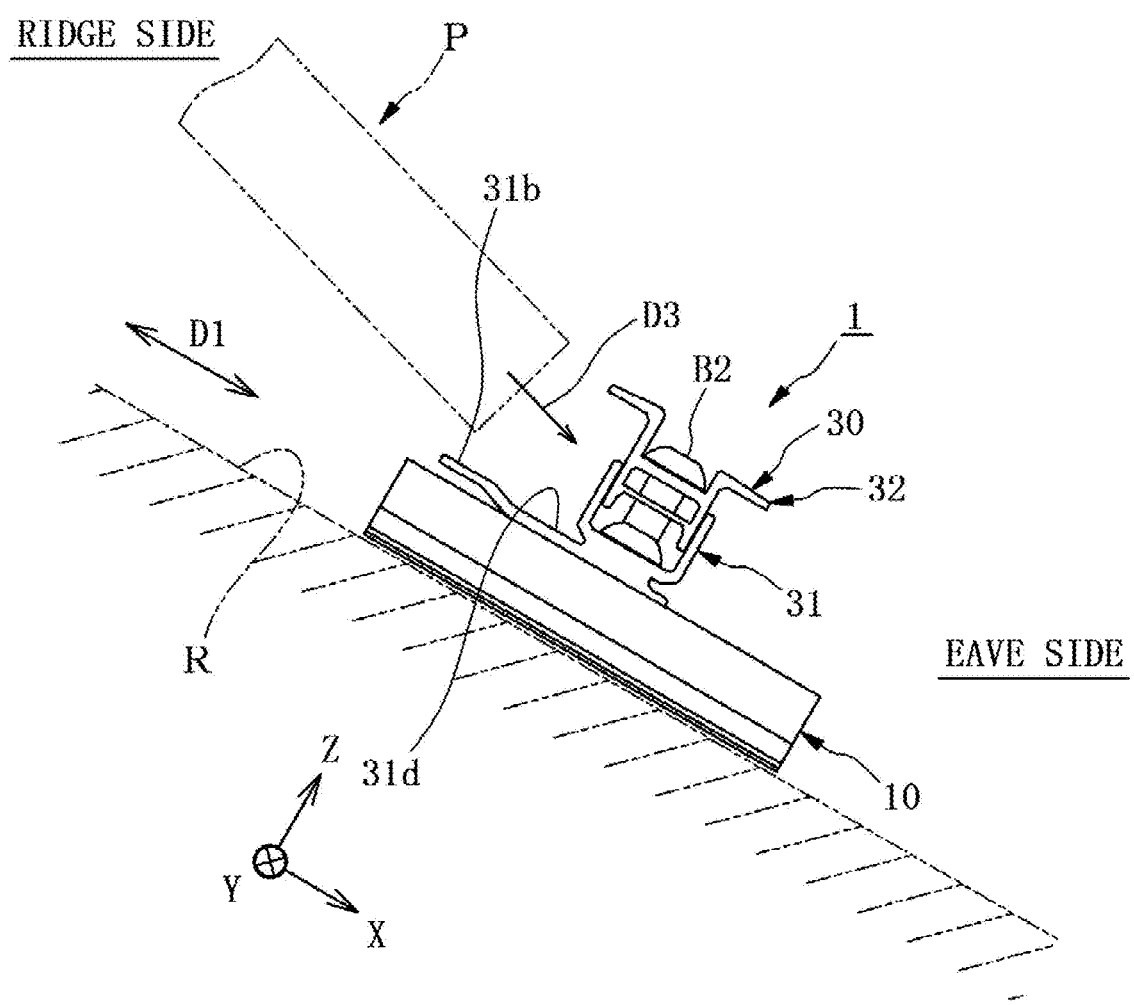
FIG. 12 is a (second) side view for explaining the effects of the trestle according to Embodiment 1.
Figure 13:
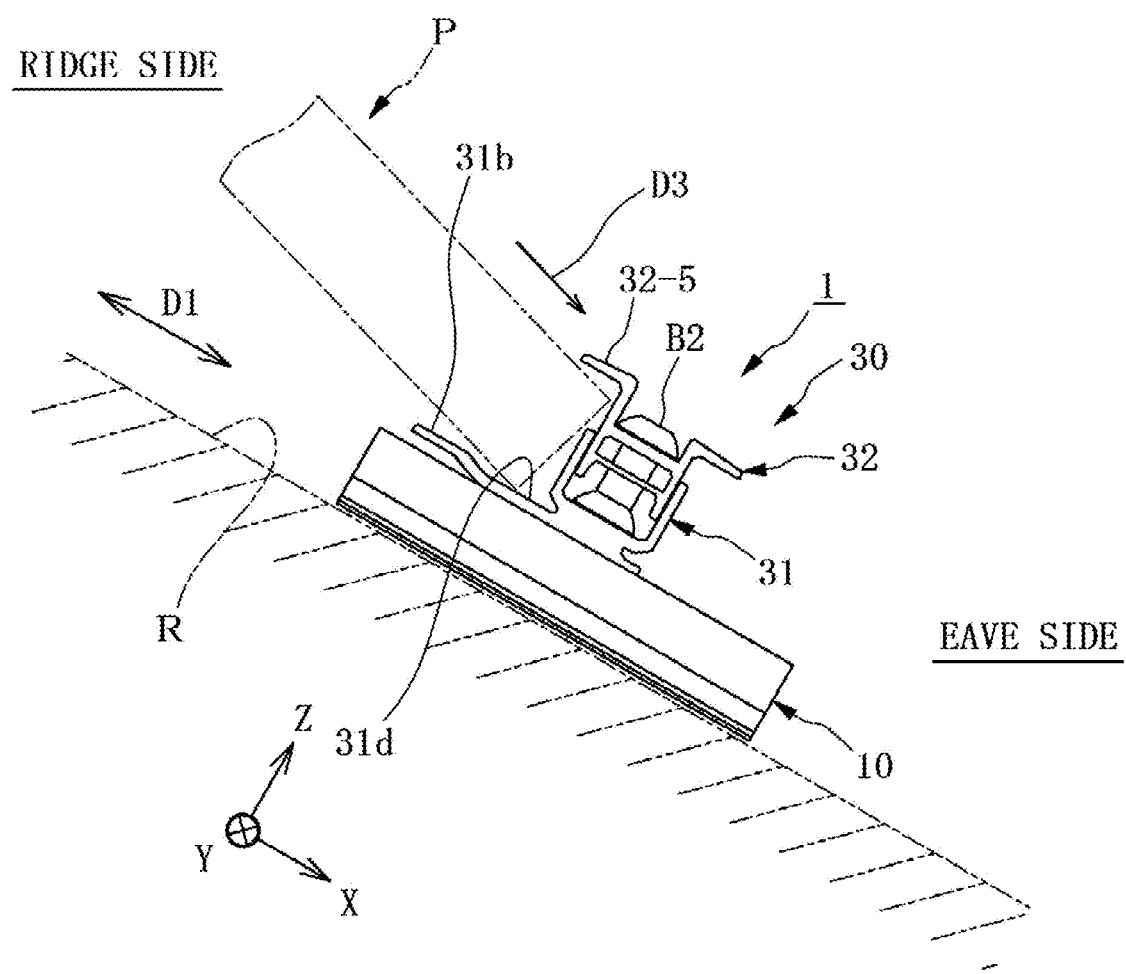
FIG. 13 is a (third) side view for explaining the effects of the trestle according to Embodiment 1.
Figure 14:
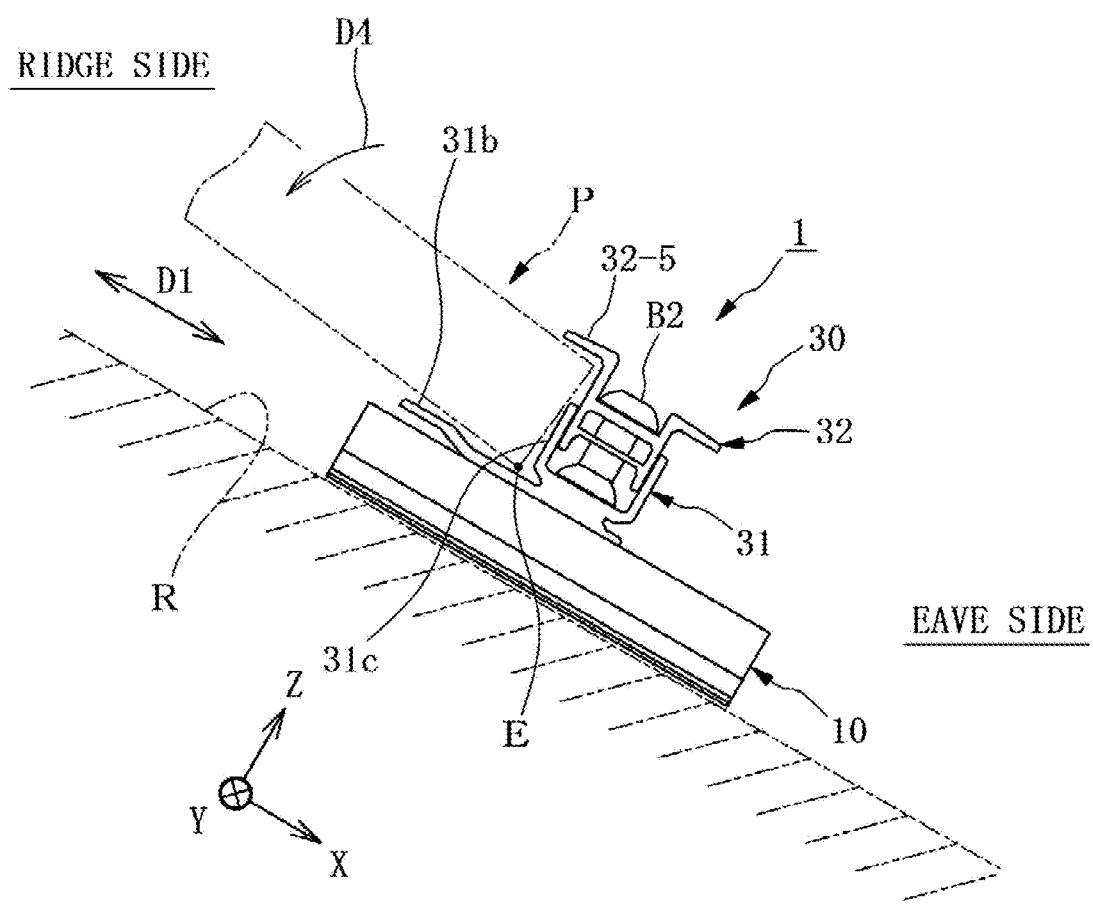
FIG. 14 is a (fourth) side view for explaining the effects of the trestle according to Embodiment 1.

Additionally, with the trestle 1 according to Embodiment 1, as illustrated in FIG. 12, the mounting surface 31b of the receiving member 31 includes the depression 31d that is formed by recessing a portion of the mounting surface 31b. As such, when attaching the solar panel P to the fixing unit 30, as illustrated in FIGS. 13 and 14, the user inserts the solar panel P toward the depression 31d from a third direction D3 inclined with respect to the mounting surface 31b and, then, rotates the solar panel P in a rotation direction D4 having an edge E on the insertion direction leading end side of the solar panel P as a base point to mount the solar panel P on the mounting surface 31b. Thereafter, the user rotates the second fastener B2 and, as a result, the extension 32-5 holds down and tightens the solar panel P to the mounting surface 31b. Thus, the solar panel P is fixed by the fixing unit 30. Thus, the user can carry out installation of the solar panel P and the trestle 1 without getting on the solar panel P from the ridge side (the −X side). As a result, the trestle 1 according to Embodiment 1 can enhance the work efficiency when carrying out installation/removal work on the roof surface R of the house.

Additionally, with the trestle 1 according to Embodiment 1, as illustrated in FIG. 3, the slide restrictors 13R, 13L are formed on the second grooves 12R, 12L formed on the respective opposing surfaces of the pair of side walls 11R, 11L. As such, when the trestle 1 is mounted on the roof surface R in a state in which the first direction D1 of the trestle 1 matches the eave-ridge direction of the roof surface R as illustrated in FIG. 2, the slide restrictors 13R, 13L restrict sliding in the +X direction of the slide bracket 20 and the fixing unit 30 with respect to the base 10, as illustrated in FIG. 3. As a result, the trestle 1 according to Embodiment 1 can enhance the work efficiency when carrying out installation/removal work on the roof surface R of the house.

Additionally, with the trestle 1 according to Embodiment 1, the slide restrictors 13R, 13L are portions that are formed by the second grooves 12R, 12L being crushed due to the side walls 11R, 11L being pressed on. As such, the slide restrictors 13R, 13L can be easily formed.

Additionally, with the trestle 1 according to Embodiment 1, as illustrated in FIG. 5, the spacing L1 between the fastener insertion holes 14a-1, 14a-2 is formed wider than the spacing L2 between the fastener insertion holes 14a-3, 14a-4. As such, when the fastener insertion holes 14a-1, 14a-2 are disposed more to the ridge side of the house than the fastener insertion holes 14a-3, 14a-4, the base 10 can be formed such that the mounting strength to the roof surface of the fastener insertion holes 14a-1, 14a-2 is greater than the mounting strength to the roof surface of the fastener insertion holes 14a-3, 14a-4. Due to this, the mounting strength of the base 10 with respect to the roof surface can be enhanced. As a result, the trestle 1 according to Embodiment 1 can enhance the work efficiency when carrying out installation/removal work on the roof surface of the house.

Figure 15A:
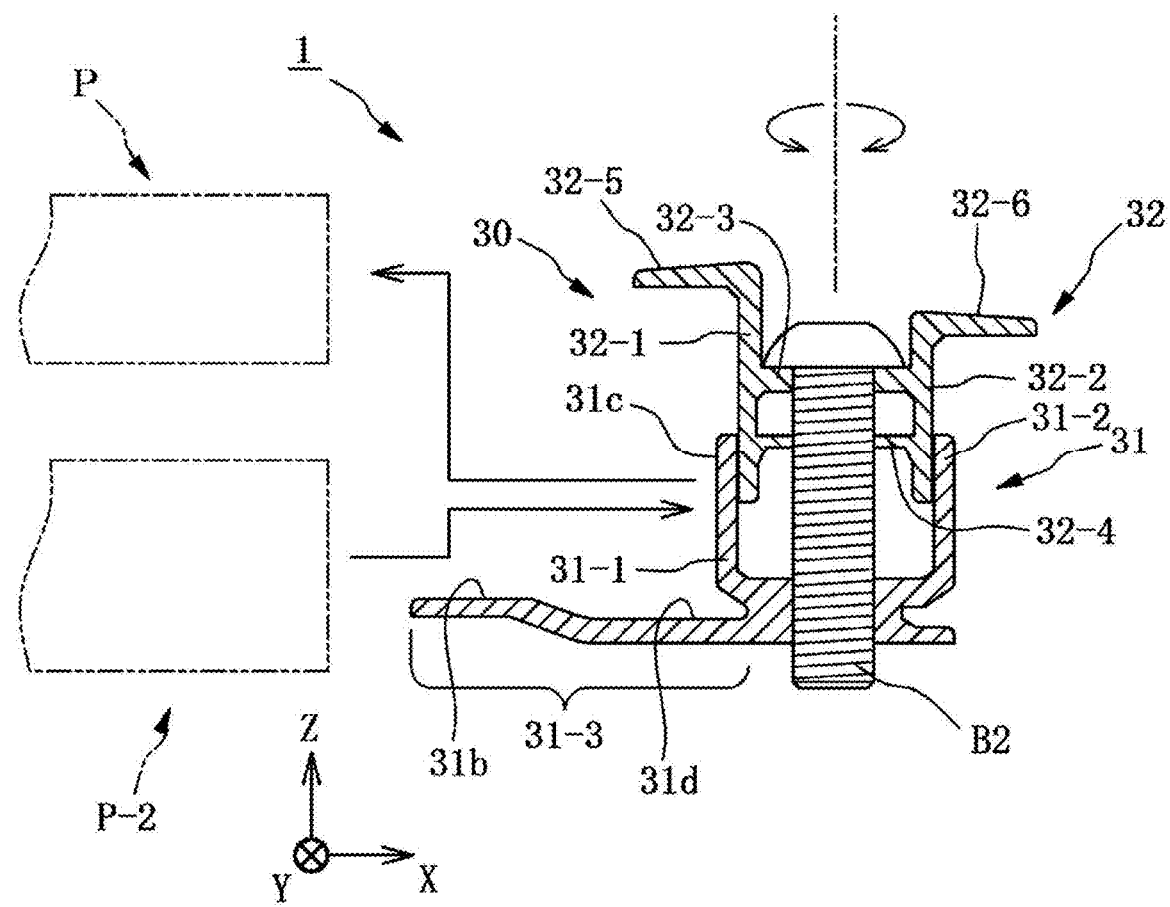
FIG. 15A is a (third) cross-sectional view for explaining the effects of the trestle according to Embodiment 1, and is a drawing corresponding to a cross-section taken along line B-B of FIG. 4.

Additionally, with the trestle 1 according to Embodiment 1, as illustrated in FIG. 15A, the side wall 32-1 of the fixing unit main body 32 is provided overlapping the side wall 31-1 of the receiving member 31, with a gap between the side wall 32-1 and the side wall 31-1. As such, the trestle 1 can use the side wall 31-1 and the side wall 32-1 to replace the solar panel P with a solar panel P-2 of a different thickness, and fix the solar panel P-2 using the fixing unit 30. Thus, the trestle 1 can fix the solar panel P, P-2 regardless of the thickness of the solar panel P, P-2. As a result, the trestle 1 according to Embodiment 1 can enhance the work efficiency when carrying out installation/removal work on the roof surface R of the house.

Figure 15B:
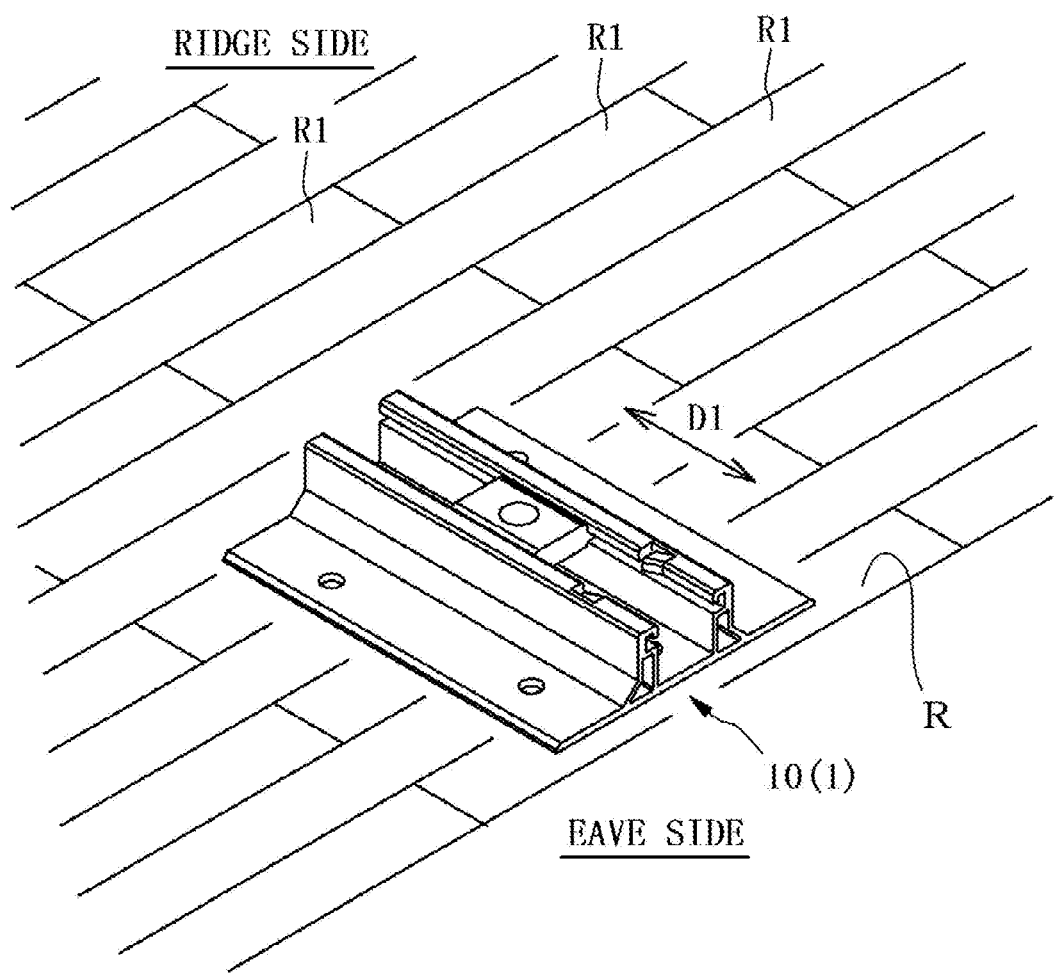
FIG. 15B is a (fourth) perspective view for explaining the effects of the trestle according to Embodiment 1.

Additionally, with the trestle 1 according to Embodiment 1, as illustrated in FIG. 6, the fastener insertion holes 14a-1 to 14a-6 are formed at positions offset in the eave-ridge direction. As such, as illustrated in FIGS. 6 and 15B, it is possible to prevent all roof surface mounting fixtures that are inserted into the fastener insertion holes 14a-1 to 14a-6 from being stuck into the gaps between roofing boards R1 of the roof surface R. Thus, the mounting strength of the base 10 with respect to the roof surface R can be enhanced. As a result, the trestle 1 according to Embodiment 1 can enhance the work efficiency when carrying out installation/removal work on the roof surface R of the house.

Embodiment 2

In Embodiment 1, the fixing unit 30 includes the receiving member 31 and the fixing unit main body 32 as illustrated in FIG. 2. However, the present disclosure is not limited thereto. A configuration is possible in which, in addition to the receiving member 31 and the fixing unit main body 32, the fixing unit 30 includes a member for adjusting the height of the solar panel P. Hereinafter, a trestle 2 according to Embodiment 2 of the present disclosure is described using the drawings. The following description focuses on the differences with Embodiment 1. With the exception of these differences, the trestle 2 according to Embodiment 2 is the same as or equivalent to the trestle 1 of Embodiment 1. Note that, to facilitate comprehension, XYZ coordinates are set and appropriately referenced.

Figure 16:
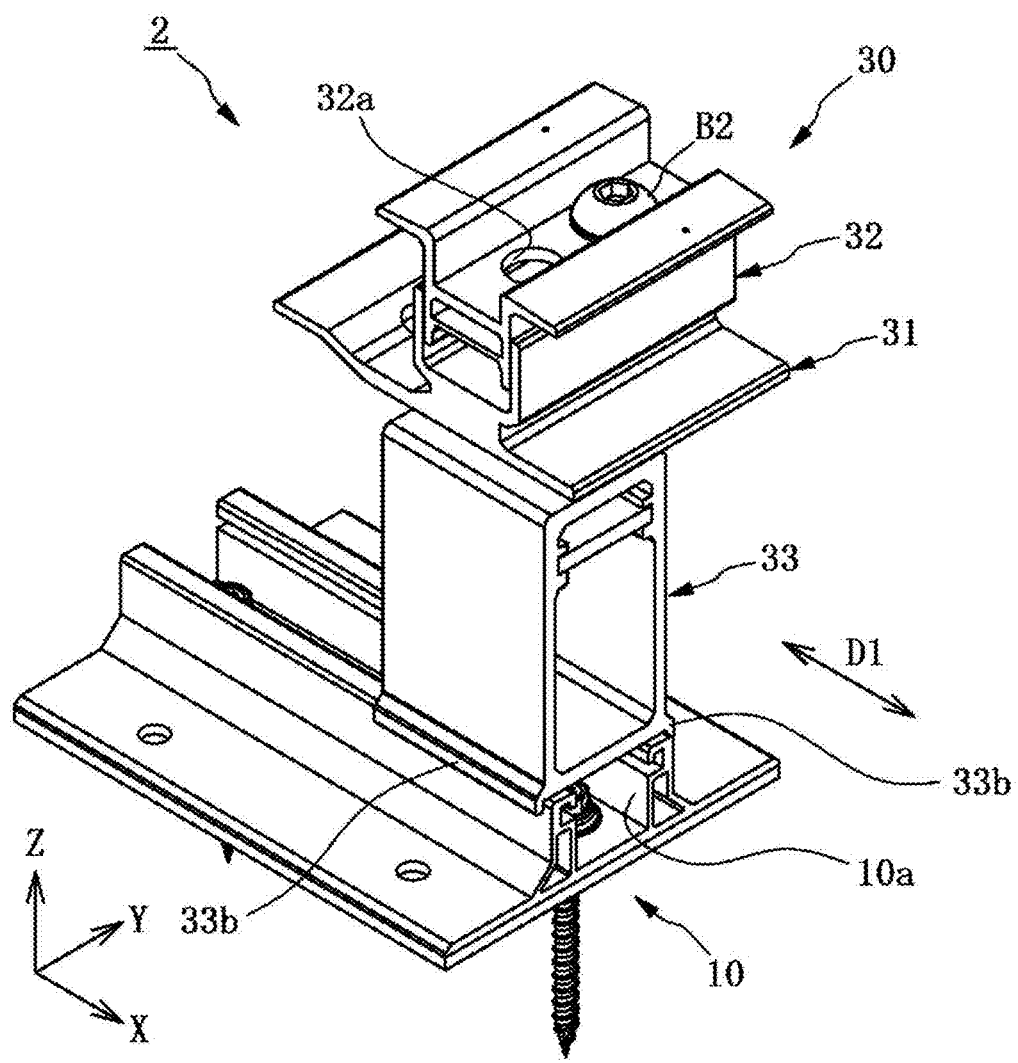
FIG. 16 is a perspective view of a trestle according to Embodiment 2.
Figure 17:
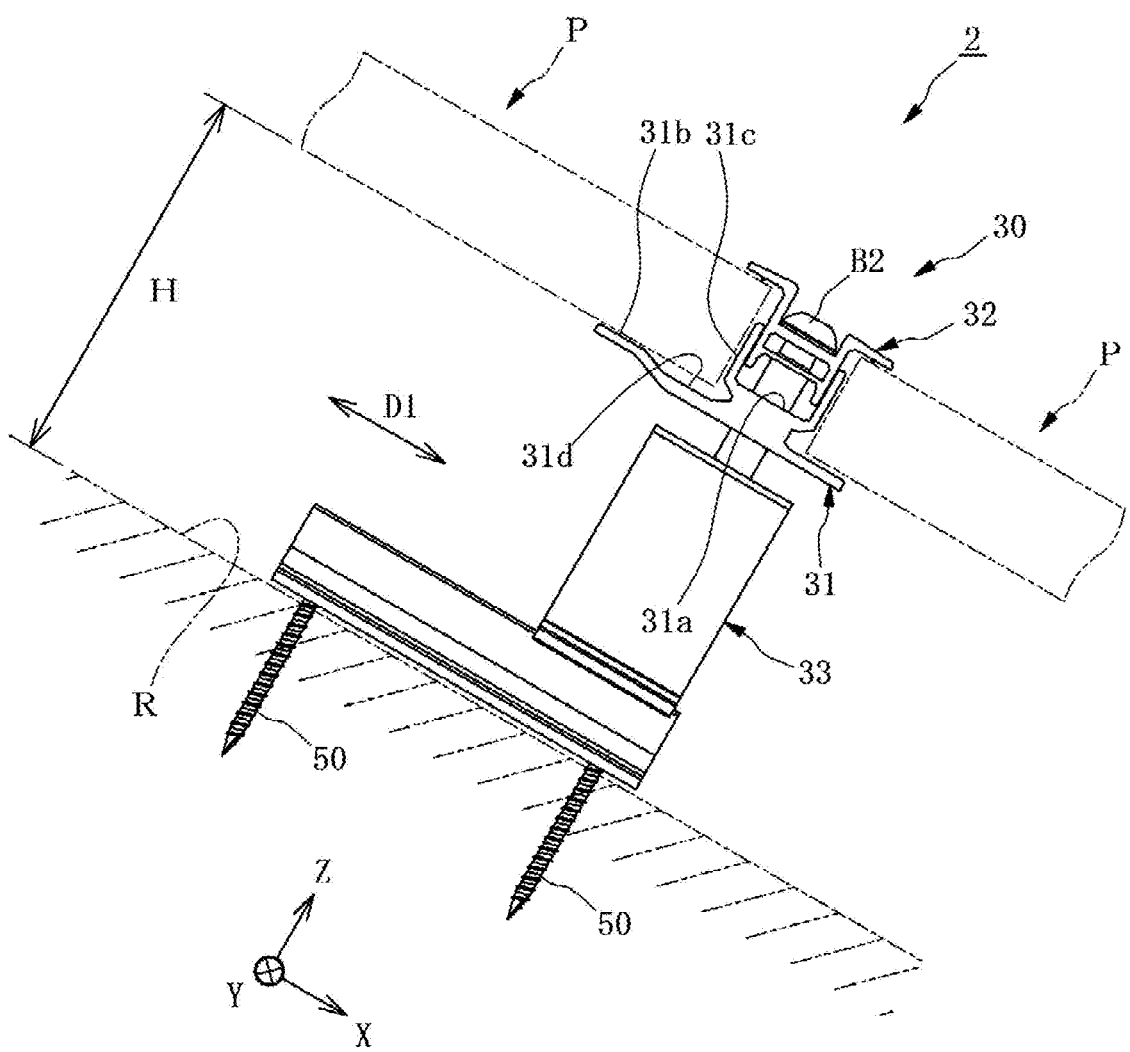
FIG. 17 is a side view of the trestle according to Embodiment 2.
Figure 18:
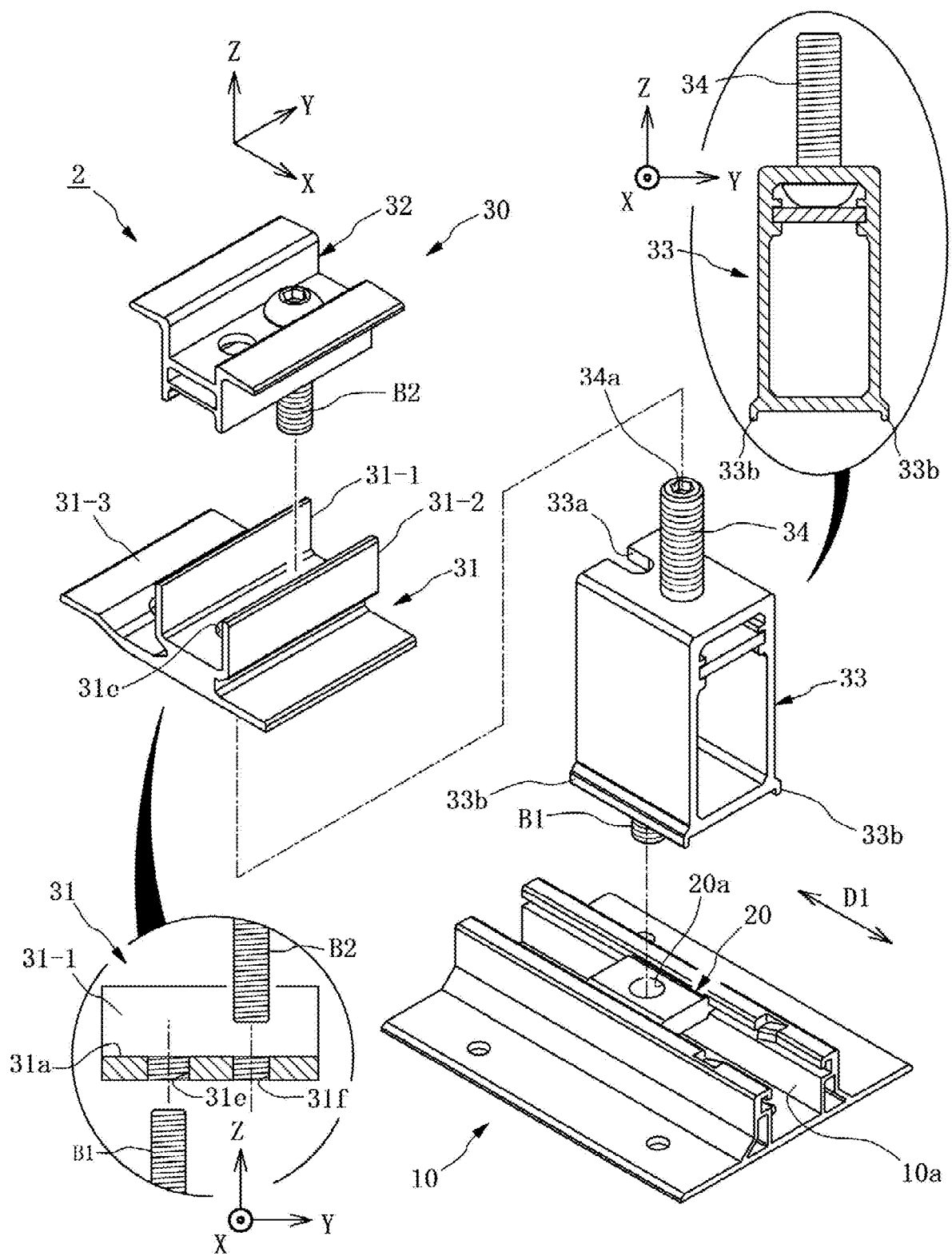
FIG. 18 is an exploded perspective view of the trestle according to Embodiment 2.

As illustrated in FIGS. 16 to 18, the trestle 2 according to Embodiment 2 includes a base 10, a slide bracket 20 (slide member), and a fixing unit 30. Additionally, the trestle 2 includes a first fastener B1 and a second fastener B2.

The base 10, the slide bracket 20, the first fastener B1, and the second fastener B2 are the same as in Embodiment 1.

In Embodiment 2, as illustrated in FIG. 18, the fixing unit 30 includes a receiving member 31, a fixing unit main body 32 and, additionally, a relay member 33 and a third fastener 34.

A hole 31e in which the first fastener B1 is inserted and a screw hole 31f in which the second fastener B2 is inserted are formed penetrating in the Z-axis direction on the receiving member 31.

Different from in Embodiment 1, the hole 31e has an inner circumferential surface that is formed into a female screw surface. The third fastener 34 is screwed into the hole 31e.

Figure 19:
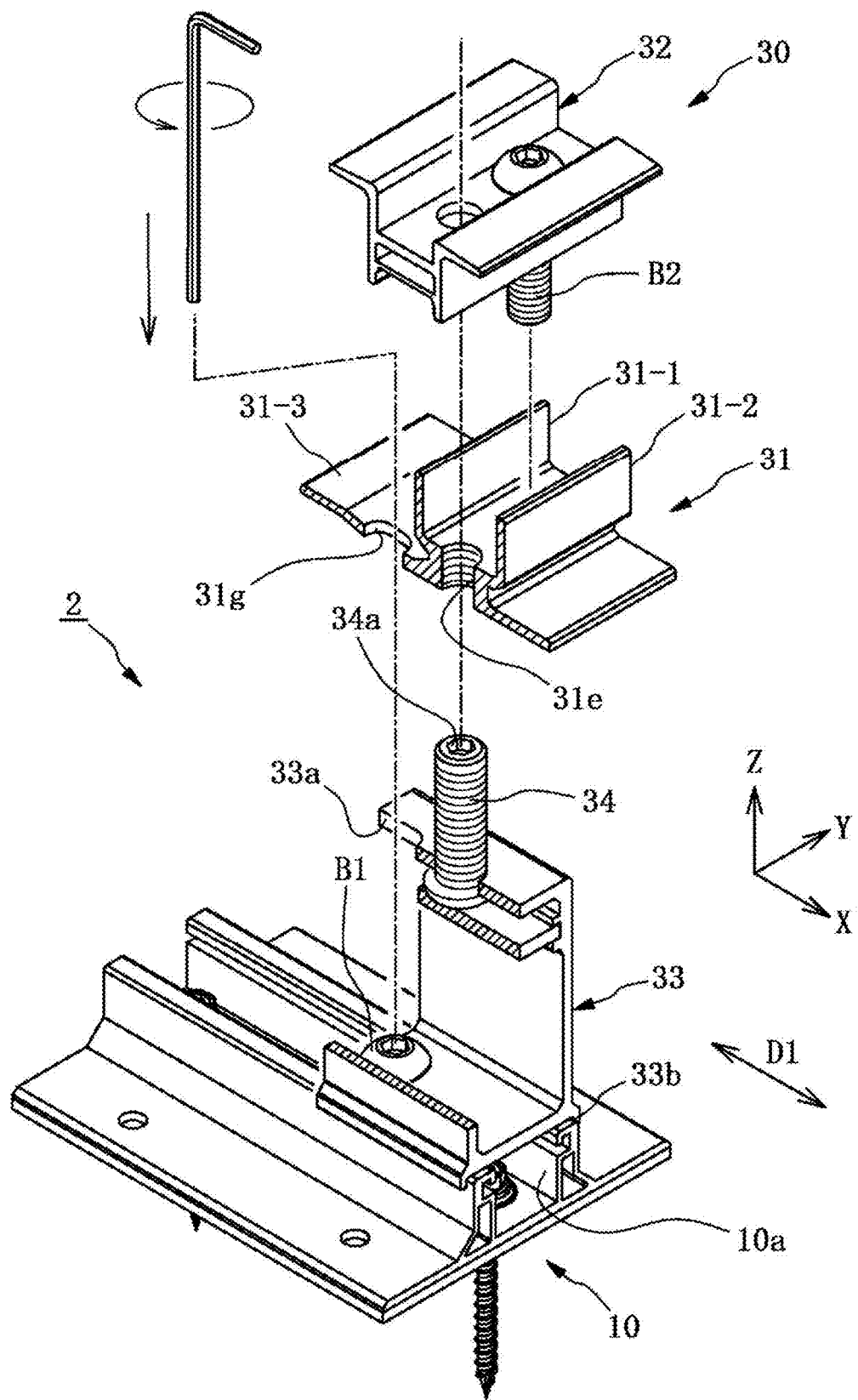
FIG. 19 is a (first) perspective view for explaining the effects of the trestle according to Embodiment 2.

In the receiving member 31, as illustrated in FIG. 19, in addition to the hole 31e and the screw hole 31f, a hole 31g is provided on an extension 31-3. The hole 31g is formed such that a cross-section thereof is substantially oval. Additionally, the hole 31g is formed penetrating in the Z-axis direction.

The fixing unit main body 32 is the same as in Embodiment 1.

Figure 20:
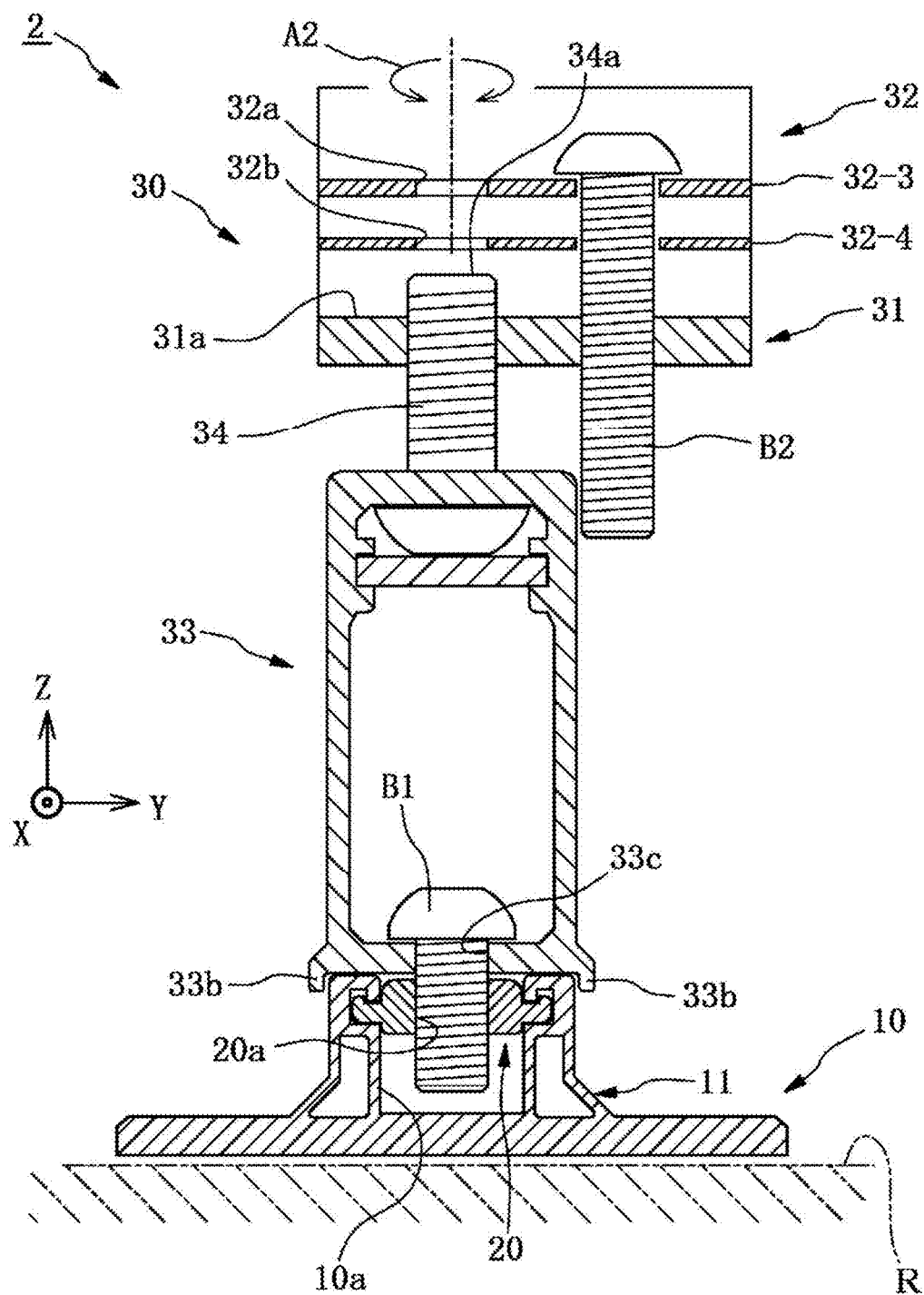
FIG. 20 is a cross-sectional view for explaining the effects of the trestle according to Embodiment 2.

As illustrated in FIG. 17, the relay member 33 is a fitting that is fixed to the slide bracket 20 and supports the receiving member 31, and that is used to raise an installation position in a height direction H (installation position in the Z-axis direction) of a solar panel P with respect to the base 10. As illustrated in FIG. 20, a hole 33c into which the first fastener B1 is screwed is formed on the relay member 33. The hole 33c has an inner circumferential surface that is formed into a female screw surface. The relay member 33 is provided so as to be liftable/lowerable with respect to the slide bracket 20 by the first fastener B1 being rotated around the axis. As illustrated in FIGS. 18 and 19, a notch 33a is formed on a ceiling portion of the relay member 33. The notch 33a is formed so as to penetrate in the Z-axis direction.

A rotation restrictor 33b is formed on the relay member 33. The rotation restrictor 33b restricts the rotation, around the axis of the third fastener 34, of the relay member 33 with respect to the base 10. Note that, in Embodiment 2, two rotation restrictors 33b are formed on the relay member 33. However, the present disclosure is not limited thereto. One rotation restrictor 33b may be formed on the relay member 33.

The third fastener 34 is constituted from a bolt or a screw, for example. The third fastener 34 is attached to the relay member 33 and the receiving member 31 by being rotated around the axis. The receiving member 31 is provided so as to be liftable/lowerable with respect to the relay member 33 by the third fastener 34 being rotated around the axis.

Figure 21:
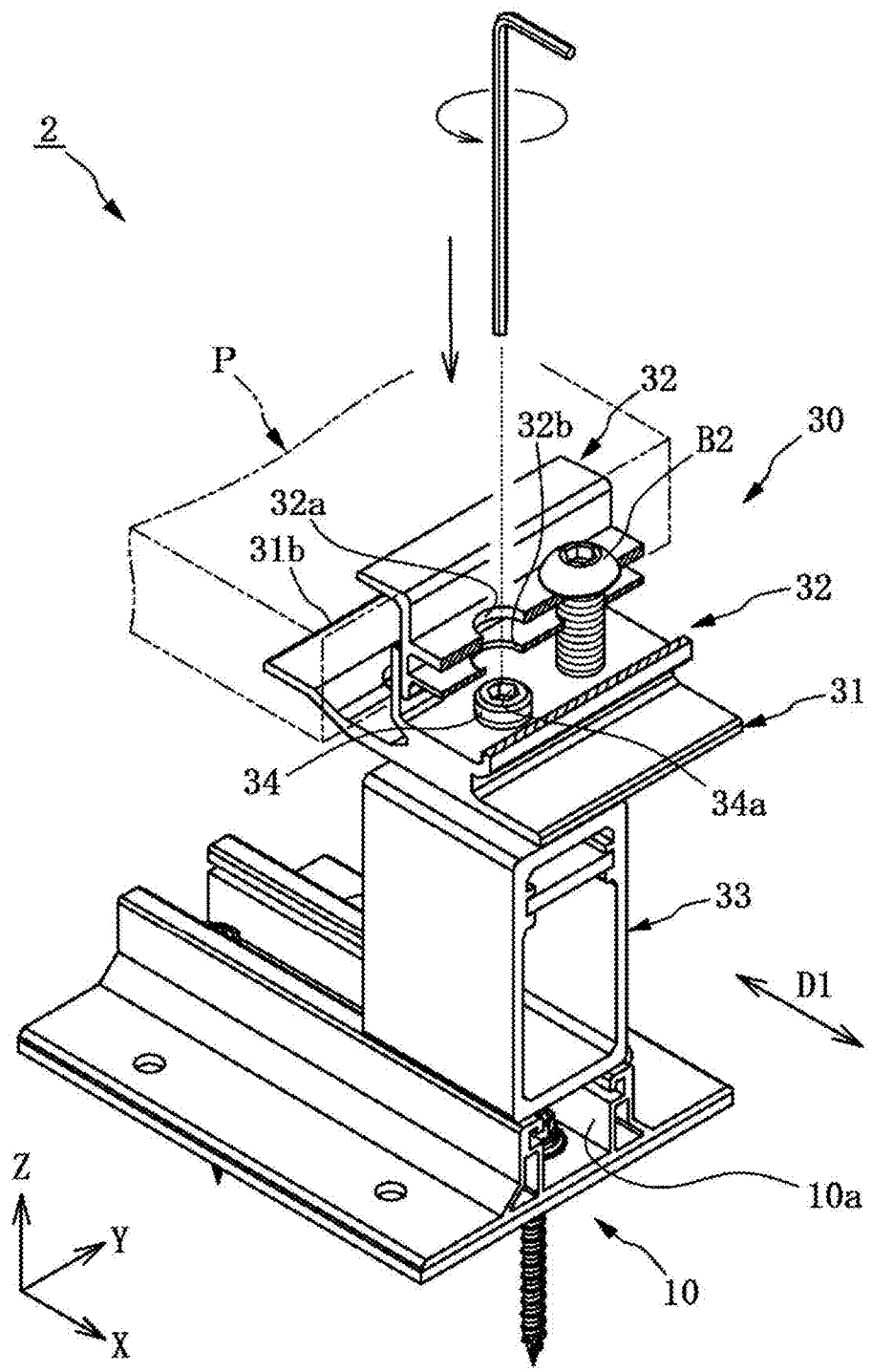
FIG. 21 is a (second) perspective view for explaining the effects of the trestle according to Embodiment 2.

As illustrated in FIGS. 20 and 21, a fitted hole 34a (second fitted member), in which a tool for releasing the fixing of the receiving member 31 and relay member 33 fits, is formed on the third fastener 34. The fitted hole 34a of the third fastener 34 is exposed to the outside in the Z-axis direction (axial direction of the third fastener 34) through the holes 32a, 32b formed in the fixing unit main body 32.

As illustrated in FIG. 19, a fitted hole B1a (first fitted member) of the first fastener B1 is exposed to the outside in the Z-axis direction (axial direction of the first fastener B1) through the hole 31g formed on the receiving member 31 and the notch 33a formed in the relay member 33.

Figure 22:
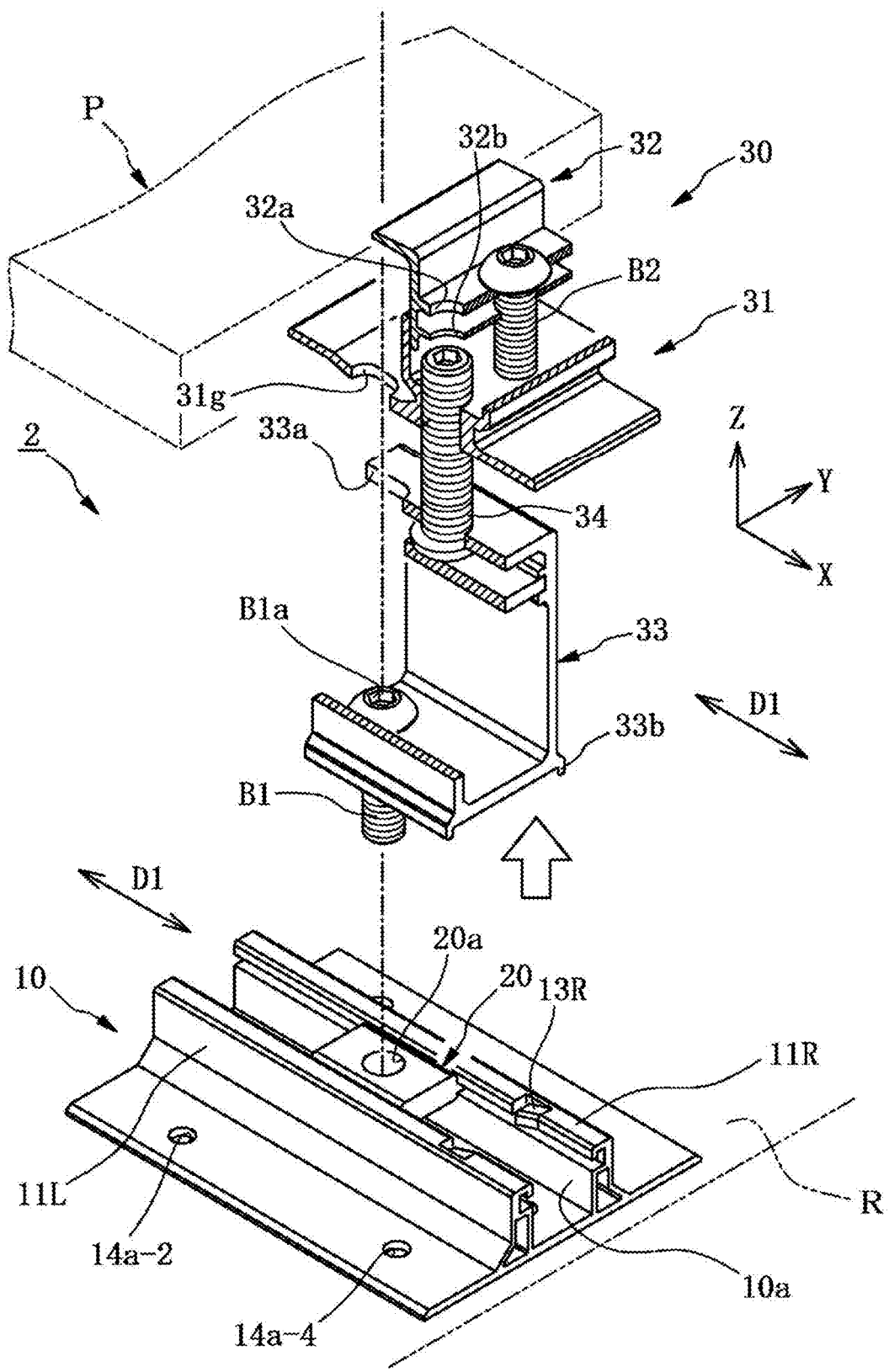
FIG. 22 is a (third) perspective view for explaining the effects of the trestle according to Embodiment 2.

As described above, with the trestle 2 according to Embodiment 2, as illustrated in FIGS. 19 and 22, the fitted hole B1a of the first fastener B1 is exposed to the outside in the Z-axis direction through the hole 31g and the notch 33a. Additionally, the first fastener B1 is attached such that the fixing between the slide bracket 20 and the fixing unit 30 can be released while maintaining the fixing between the receiving member 31, the fixing unit main body 32, and the relay member 33 by the second fastener B2. Thus, in the trestle 2, it is possible to remove the fixing unit 30 from the slide bracket 20 while the solar panel P is fixed by the fixing unit 30. As a result, the trestle 2 according to Embodiment 2 can enhance the work efficiency when carrying out installation/removal work on the roof surface R of the house.

Additionally, with the trestle 2 according to Embodiment 2, as illustrated in FIGS. 20 and 22, the fitted hole 34a of the third fastener 34 is exposed to the outside in the Z-axis direction through the holes 32a, 32b. Moreover, the third fastener 34 is attached such that the receiving member 31 and the fixing unit main body 32 can be removed from the relay member 33 while maintaining the fixing between the receiving member 31 and the fixing unit main body 32 by the second fastener B2. Thus, in the trestle 2, it is possible to remove the receiving member 31 and the fixing unit main body 32 from the base 10 or the relay member 33 while the solar panel P is fixed to the receiving member 31 and the fixing unit main body 32. As a result, the trestle 2 according to Embodiment 2 can enhance the work efficiency when carrying out installation/removal work on the roof surface R of the house.

Figure 23:
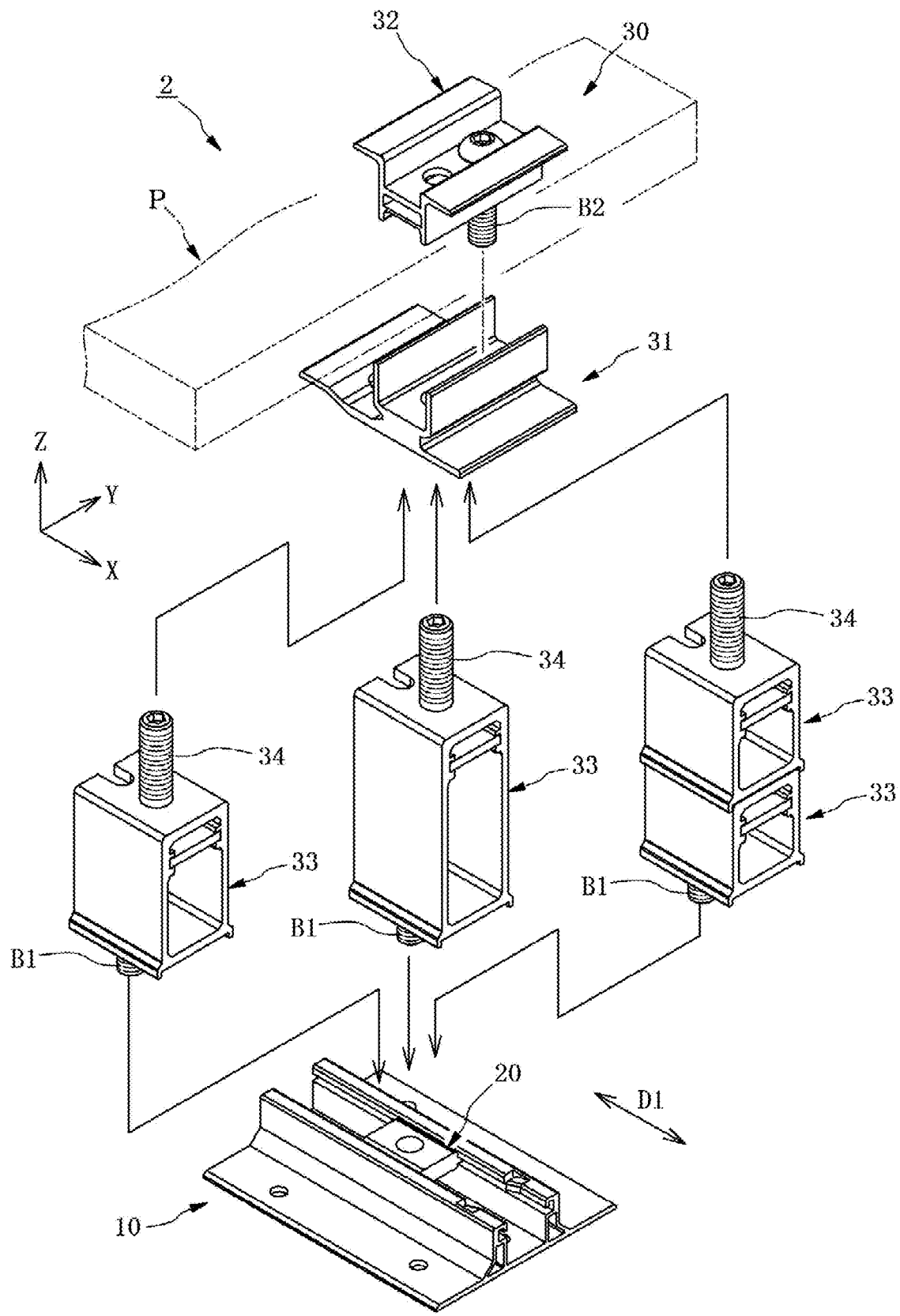
FIG. 23 is a (fourth) perspective view for explaining the effects of the trestle according to Embodiment 2.

Additionally, with the trestle 2 according to Embodiment 2, as illustrated in FIG. 23, the fixing unit 30 includes the relay member 33. As such, by appropriately replacing the relay member 33 with a relay member 33 having a different height in the Z-axis direction, the trestle 2 can change the installation position in the height direction of the solar panel P.

Additionally, with the trestle 2 according to Embodiment 2, the third fastener 34 is screwed into the screw hole of the receiving member 31. As such, the receiving member 31 and the fixing unit main body 32 are provided so as to be capable of lifting/lowering with respect to the relay member 33 by the third fastener 34 being rotated with respect to the screw hole of the receiving member 31. Thus, in the trestle 2, it is possible to lift/lower the receiving member 31 and the fixing unit main body 32 with respect to the relay member 33 while the solar panel P is fixed to the receiving member 31 and the fixing unit main body 32. As a result, the trestle 2 according to Embodiment 2 can enhance the work efficiency when carrying out installation/removal work on the roof surface R of the house.

Additionally, with the trestle 2 according to Embodiment 2, the second fastener B2 is attached to the fixing unit 30 such that the lower end of the second fastener B2 protrudes out from the relay member 33. As such, as illustrated by arrow A2 of FIG. 20, when the receiving member 31 and the fixing unit main body 32 are rotated around the axis of the first fastener B1 with respect to the relay member 33, the lower end of the second fastener B2 interferes with the relay member 33. As a result, the receiving member 31 and the fixing unit main body 32 do not rotate more than a predetermined amount with respect to the relay member 33 and the base 10. Thus, the trestle 2 according to Embodiment 2 can enhance the work efficiency when carrying out installation/removal work on the roof surface R of the house.

Additionally, with the trestle 2 according to Embodiment 2, as illustrated in FIG. 20, the rotation restrictor 33b is formed on the relay member 33. The rotation restrictor 33b restricts the relay member 33 from rotating around the axis of the third fastener 34 with respect to the base 10. Thus, the trestle 2 according to Embodiment 2 can enhance the work efficiency when carrying out installation/removal work on the roof surface R of the house.

Additionally, in Embodiment 2 as well, as illustrated in FIG. 17, a pressure receiving surface 31c that receives the weight of the solar panel P fixed by the fixing unit 30 is formed on the receiving member 31. Moreover, the fixing unit main body 32 is fitted into the groove 31a formed in the receiving member 31 and, as such, is formed so as not to receive the weight of the solar panel P. As such, the trestle 2 according to Embodiment 2 can enhance the work efficiency when carrying out installation/removal work on the roof surface R of the house.

Additionally, in Embodiment 2 as well, a mounting surface 31b of the receiving member 31 includes a depression 31d that is formed by recessing a portion of the mounting surface 31b. Thus, the user can carry out installation of the solar panel P and the trestle 2 without getting on the solar panel P from the ridge side (the −X side). As a result, the trestle 2 according to Embodiment 2 can enhance the work efficiency when carrying out installation/removal work on the roof surface R of the house.

As illustrated in FIG. 18, the base 10 according to Embodiment 2 has a structure equivalent to that of Embodiment 1 and, as such, can demonstrate effects equivalent to those of Embodiment 1.

Embodiment 3

Embodiments of the present disclosure are described above, but the present disclosure is not limited by the embodiments described above.

For example, in Embodiments 1 and 2, one second fastener B2 of the trestle 1, 2 is provided. However, the present disclosure is not limited thereto. As in Embodiment 3 illustrated in FIG. 24, a configuration is possible in which a trestle 3 includes two second fasteners B2. In such a case, since a length in a width direction (the Y-axis direction) of the fixing unit 30 increases, the trestle 3 can fix two solar panels P arranged from the eave side. Modified Examples of Embodiments 1 to 3

In Embodiments 1 and 2, as illustrated in FIGS. 4 and 20, the first fastener B1 is constituted from a bolt or a screw that is attached to the slide bracket 20 and the fixing unit 30 by being rotated around the axis. However, the present disclosure is not limited thereto. The first fastener B1 may be a member other than a bolt or a screw.

In Embodiments 1 and 2, as illustrated in FIGS. 4 and 20, the second fastener B2 is constituted from a bolt or a screw that is attached to the fixing unit 30 by being rotated around the axis. However, the present disclosure is not limited thereto. The second fastener B2 may be a member other than a bolt or a screw.

In Embodiment 2, as illustrated in FIG. 20, the third fastener 34 is constituted from a bolt or a screw that is attached to the relay member 33 and the receiving member 31 by being rotated around the axis. However, the present disclosure is not limited thereto. The third fastener 34 may be a member other than a bolt or a screw.

In Embodiment 1, as illustrated in FIGS. 8 and 9A, the holes 32a, 32b that expose the fitted hole B1a to the outside are formed on the fixing unit 30. However, the present disclosure is not limited thereto. Provided that the shape exposes the fitted hole B1a to the outside, a shape other than a hole may be used. For example, a notch that exposes the fitted hole B1 to the outside may be formed on the fixing unit 30.

In Embodiments 1 and 2, the fitted hole B1a is formed on the first fastener B1 as a portion in which a tool is fitted. However, the present disclosure is not limited thereto. Provided that a portion is provided in which a tool is fitted, a shape other than a hole may be used.

In Embodiments 1 and 2, the fitted hole is formed on the second fastener B2 as a portion in which a tool is fitted. However, the present disclosure is not limited thereto. Provided that a portion is provided in which a tool is fitted, a shape other than a hole may be used.

In Embodiment 2, as illustrated in FIGS. 19 and 22, the hole 31g and the notch 33a that expose the fitted hole 34a to the outside are formed on the fixing unit 30. However, the present disclosure is not limited thereto. Provided that the shape exposes the fitted hole 34a to the outside, a shape other than a hole or a notch may be used.

In Embodiment 2, the fitted hole 34a is formed on the third fastener 34 as a portion in which a tool is fitted. However, the present disclosure is not limited thereto.

Provided that a portion is provided in which a tool is fitted, a shape other than a hole may be used.

In Embodiment 1, as illustrated in FIGS. 8 and 9A, the holes 32a, 32b that expose the fitted hole B1a to the outside are formed on the fixing unit 30. However, the present disclosure is not limited thereto. Provided that the shape exposes the fitted hole B1a to the outside, a shape other than a hole may be used. For example, a notch that exposes the fitted hole B1a to the outside may be formed on the fixing unit 30.

Additionally, in Embodiments 1 and 2, as illustrated in FIGS. 5 and 6, the six fastener insertion holes 14a-1 to 14a-6 are formed on the base 10. The forming positions of the base 10 and the number of fastener insertion holes that are formed can be appropriately changed.

Figure 25:
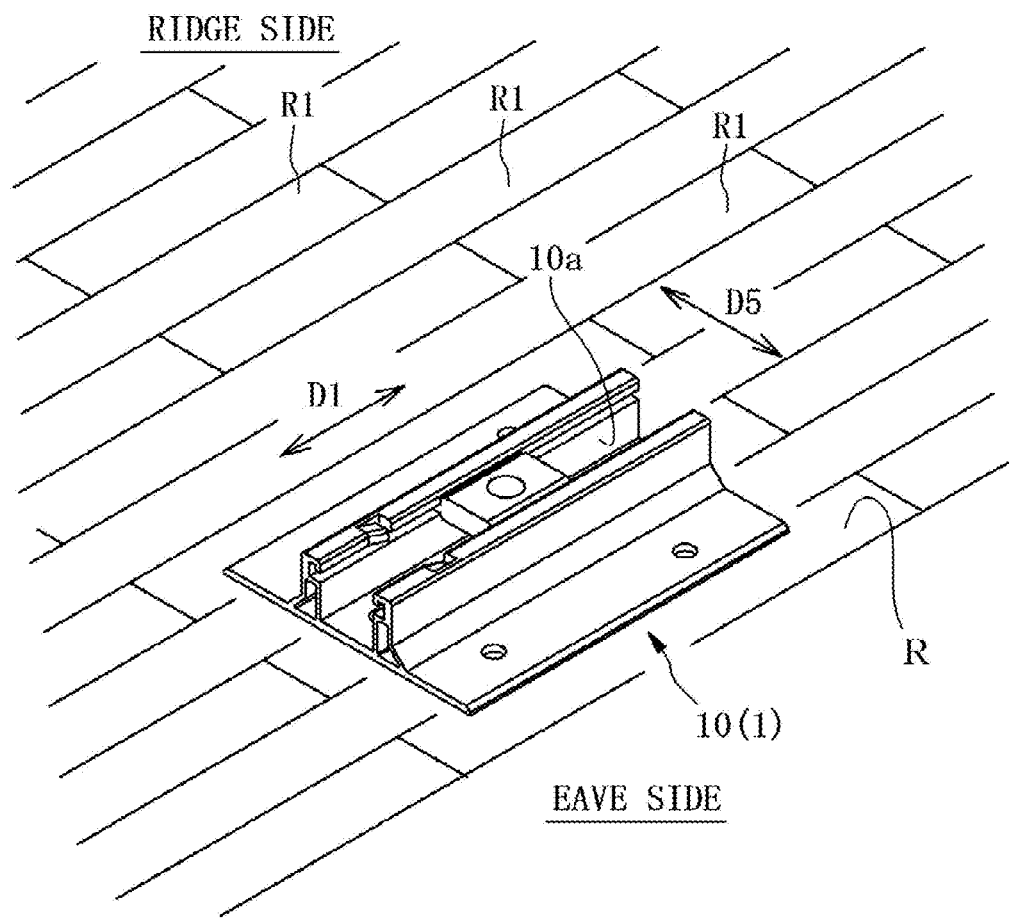
FIG. 25 is a perspective view illustrating another use state of the trestle.

In Embodiment 1, referencing FIG. 15B, it is clear that the trestle 1 is mounted on the roof surface R such that the first direction D1, which is the forming direction of the first groove 10a of the base 10, matches the eave-ridge direction of the house. However, the present disclosure is not limited thereto. As illustrated in FIG. 25, the trestle 1 may by mounted on the roof surface R such that the first direction D1, which is the forming direction of the first groove 10a of the base 10, does not match a direction D5, which is the eave-ridge direction of the house. Any direction can be used for the mounting direction of the trestle 1, and the mounting direction can be appropriately changed.

Figure 24:
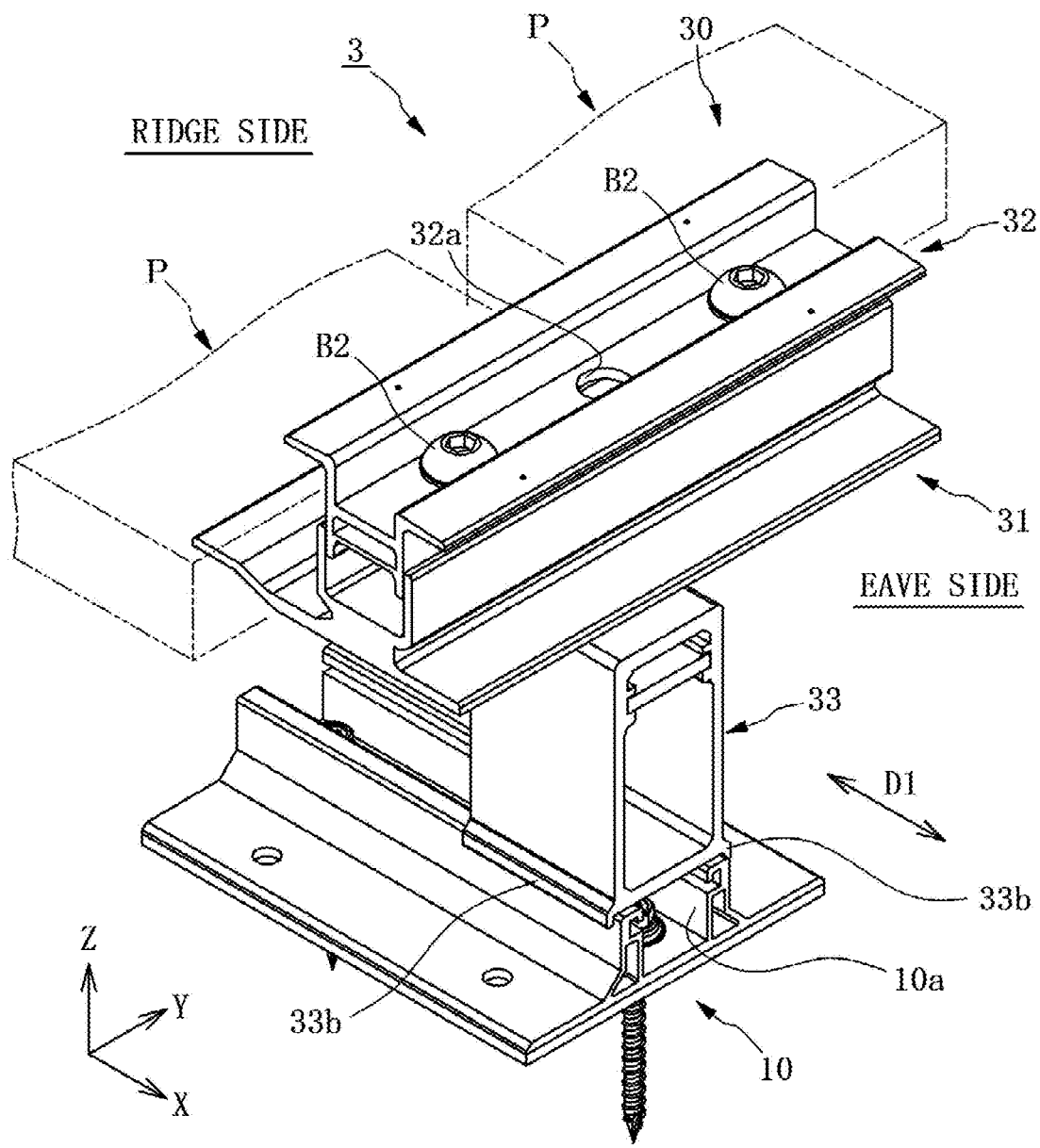
FIG. 24 is a perspective view of a trestle according to Embodiment 3.

As illustrated in FIGS. 2, 17, and 24, the trestles 1 to 3 according to the embodiments are mounted on the roof of the house and fix the solar panel P. However, the present disclosure is not limited thereto. The trestles 1 to 3 may be mounted on a surface other than the roof of the house and support the solar panel P. For example, the trestles 1 to 3 may support the solar panel P on the ground.

Additionally, in the embodiments, it is described that the trestles 1 to 3 are for fixing a solar panel. However, the present disclosure is not limited thereto. The trestles 1 to 3 may support an object to be installed on the roof of the house other than a solar panel. For example, the trestles 1 to 3 may support a water heater panel. The trestles 1 to 3 can support any object that is a framed panel. Furthermore, the trestles 1 to 3 may support objects other than framed panels.

Embodiment 4

Figure 26:
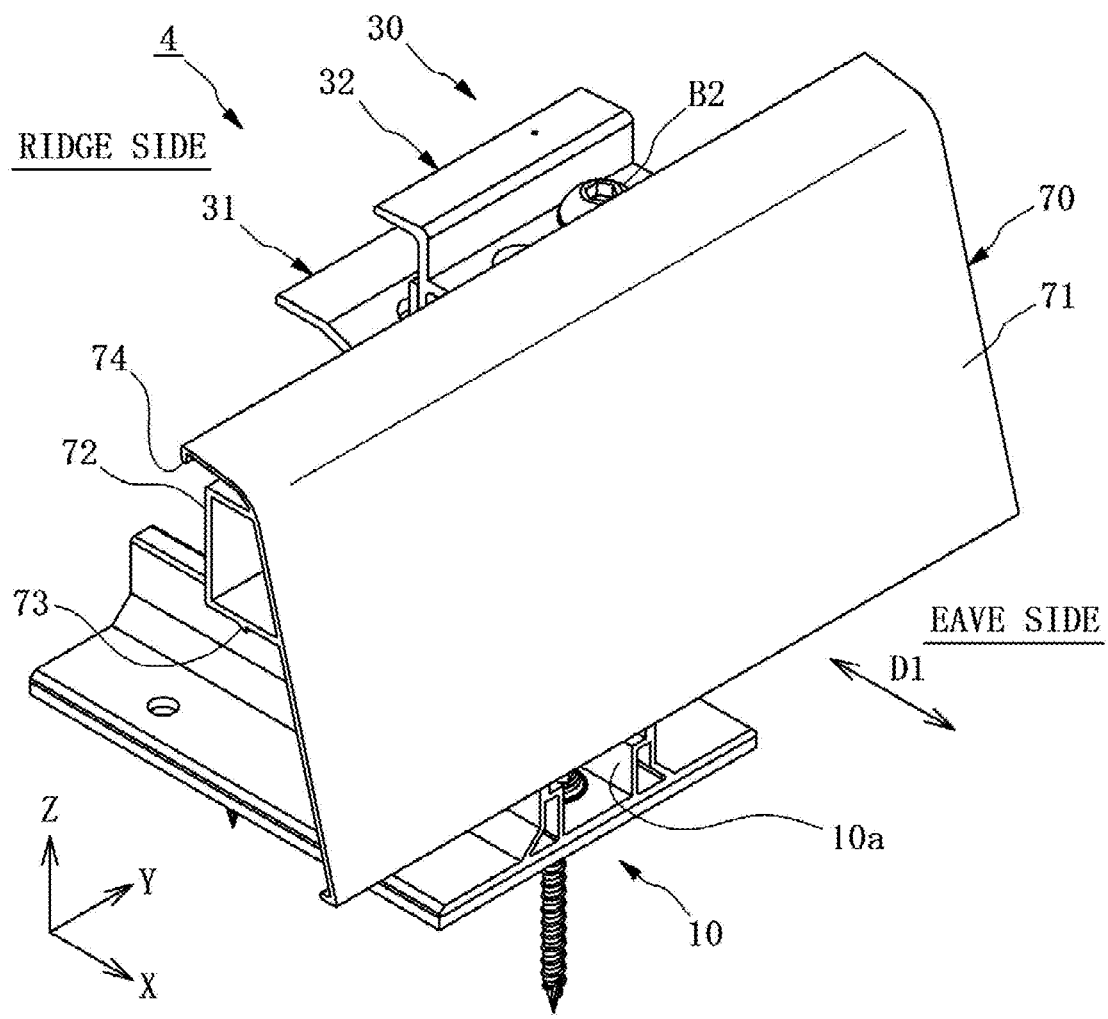
FIG. 26 is a perspective view of a trestle according to Embodiment 4.
Figure 27:
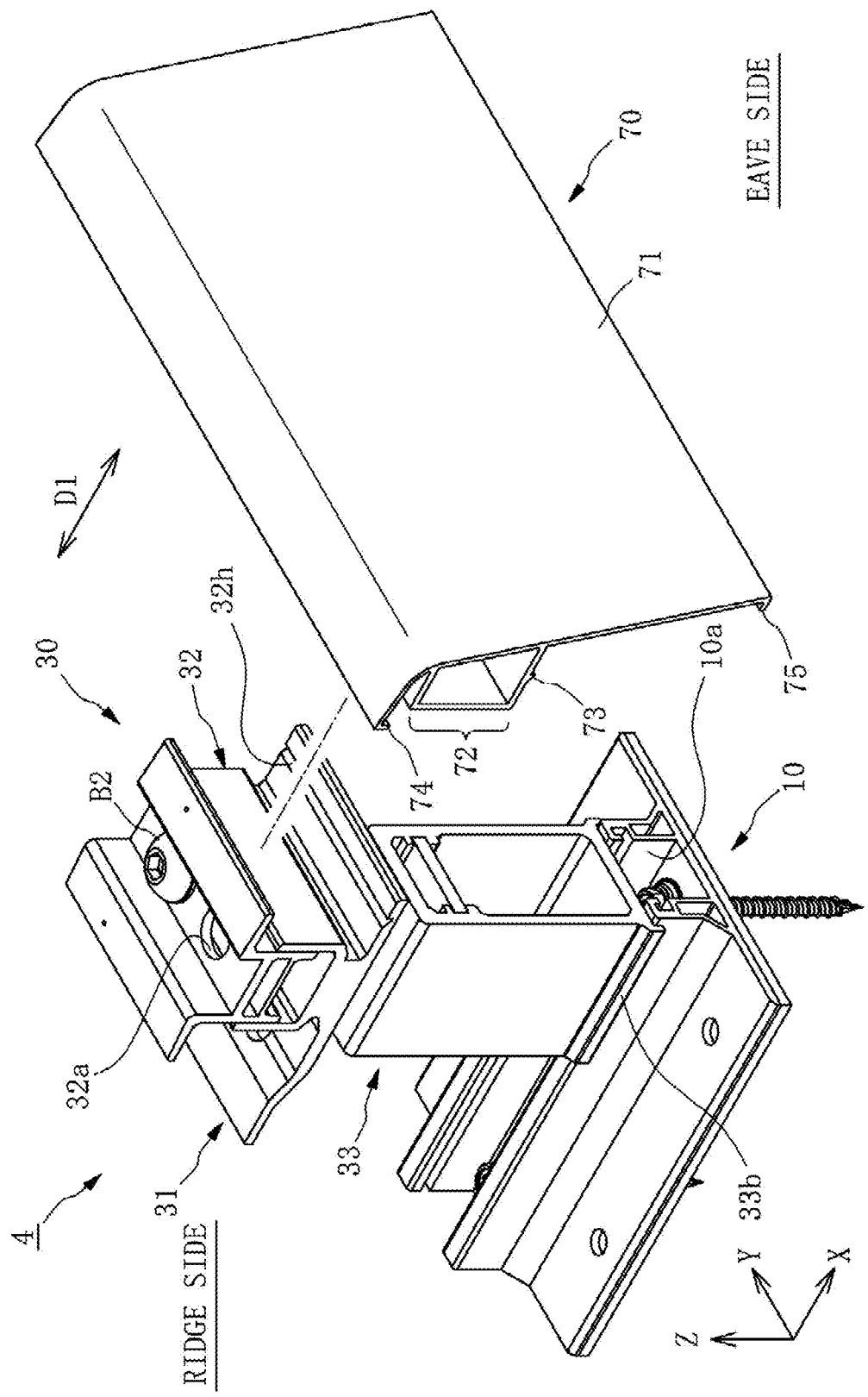
FIG. 27 is an exploded perspective view of the trestle according to Embodiment 4.

In Embodiment 2, the fixing unit 30 is exposed to the eave side (the +X side) as illustrated in FIG. 17. However, the present disclosure is not limited thereto. As illustrated in FIGS. 26 and 27, a configuration is possible in which a trestle 4 includes a cover 70. Hereinafter, a trestle 4 according to Embodiment 4 of the present disclosure is described using the drawings. The following description focuses on the differences with Embodiment 2. With the exception of these differences, the trestle 4 according to Embodiment 4 is the same as or equivalent to the trestle 2 of Embodiment 2. Note that, to facilitate comprehension, XYZ coordinates are set and appropriately referenced.

Figure 28:
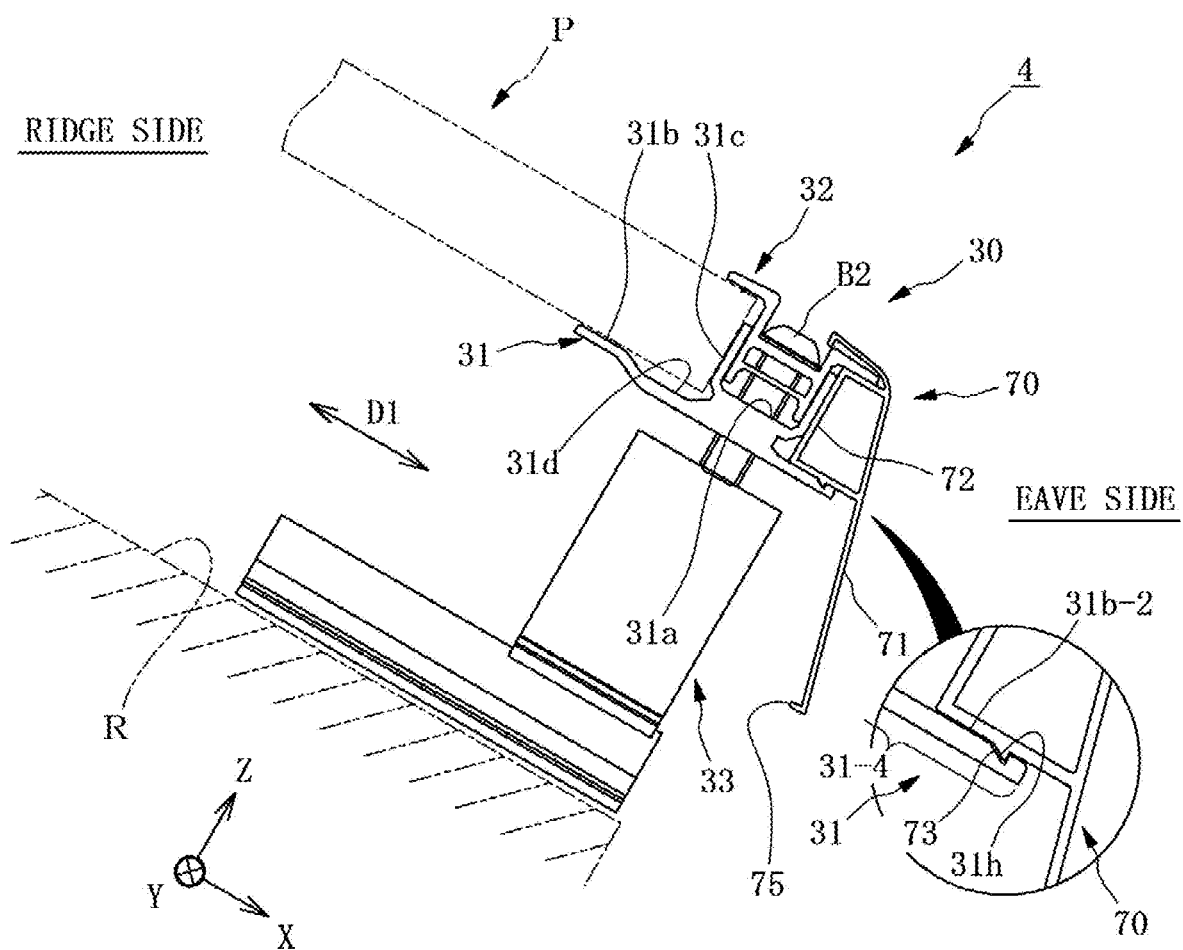
FIG. 28 is a side view of the trestle according to Embodiment 4.

As illustrated in FIGS. 27 and 28, the trestle 4 according to Embodiment 4 includes a cover 70 in addition to a fixing unit 30 and the like.

A base 10, a slide bracket 20, a fixing unit 30, a first fastener B1, and a second fastener B2 of the trestle 4 are the same as in Embodiment 2.

With the trestle 4, as illustrated in FIG. 28, an eave-side mounting surface 31b-2, separate from a ridge-side mounting surface 31b, is formed on a receiving member 31 of the fixing unit 30.

The mounting surface 31b-2 is provided on an upper surface (+Z side surface) of an extension 31-4 extending in a direction (the +X direction) opposite an extension 31-3 on which the mounting surface 31b is formed. A portion of the cover 70 is mounted on the mounting surface 31b-2. Additionally, an engaged portion 31h is formed on the mounting surface 31b-2.

Figure 29:
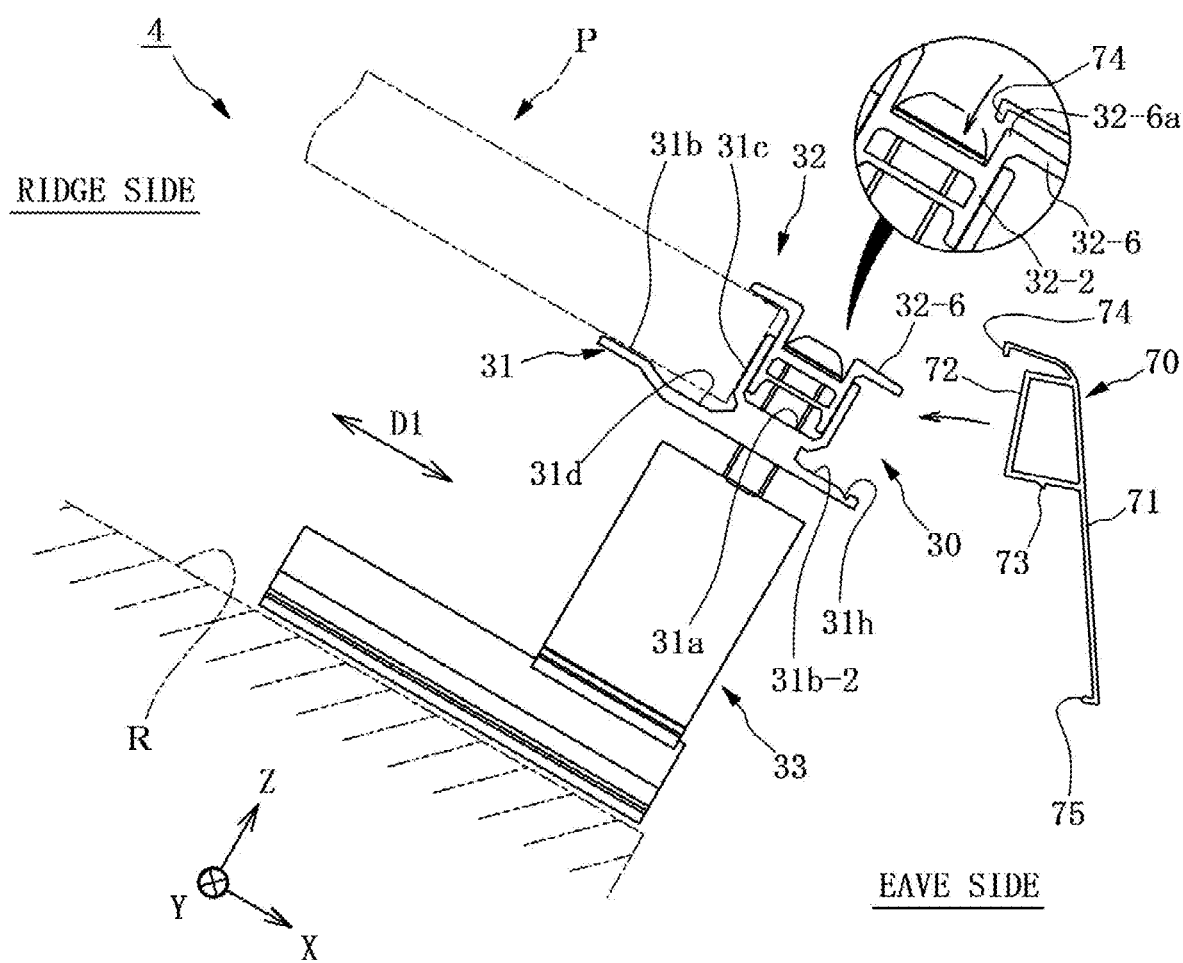
FIG. 29 is a (first) side view for explaining the attaching of a cover to a fixing unit in the trestle according to Embodiment 4.

As illustrated in FIG. 29, an extension 32-6 of a fixing unit main body 32 is formed facing the mounting surface 31b-2 so as to sandwich the portion of the cover 70 mounted on the mounting surface 31b-2.

The cover 70 is a member that covers a portion of the fixing unit 30 from the outside. Specifically, the cover 70 is formed so as to cover the eave-side (the +X side), in the eave-ridge direction (the X-axis direction) of the house, of the fixing unit 30. The cover 70 is constituted from an electrically conductive material. In one example, the cover 70 is formed by extruding a metal. Specifically, in one example, the cover 70 is formed by extruding aluminum and, then, subjecting the surface thereof to black color alumite treatment. As a result, the silver color, which is the color of the aluminum itself, is covered. Note that, in Embodiment 4, the cover 70 covers a portion of the fixing unit 30, but the present disclosure is not limited thereto, and the cover 70 may cover an entirety of the fixing unit 30. The cover 70 according to Embodiment 4 includes a cover main body 71, and a tubular portion 72 for assembling the cover main body 71 on the fixing unit 30.

The tubular portion 72 is formed in a rectangular tube shape that extends in the Y-axis direction. The tubular portion 72 is a portion that is disposed between the mounting surface 31b-2 of the receiving member 31 and the extension 32-6 of the fixing unit main body 32. An engager 73 is formed on a lower surface (surface toward the −Z side) of the tubular portion 72.

Figure 30:
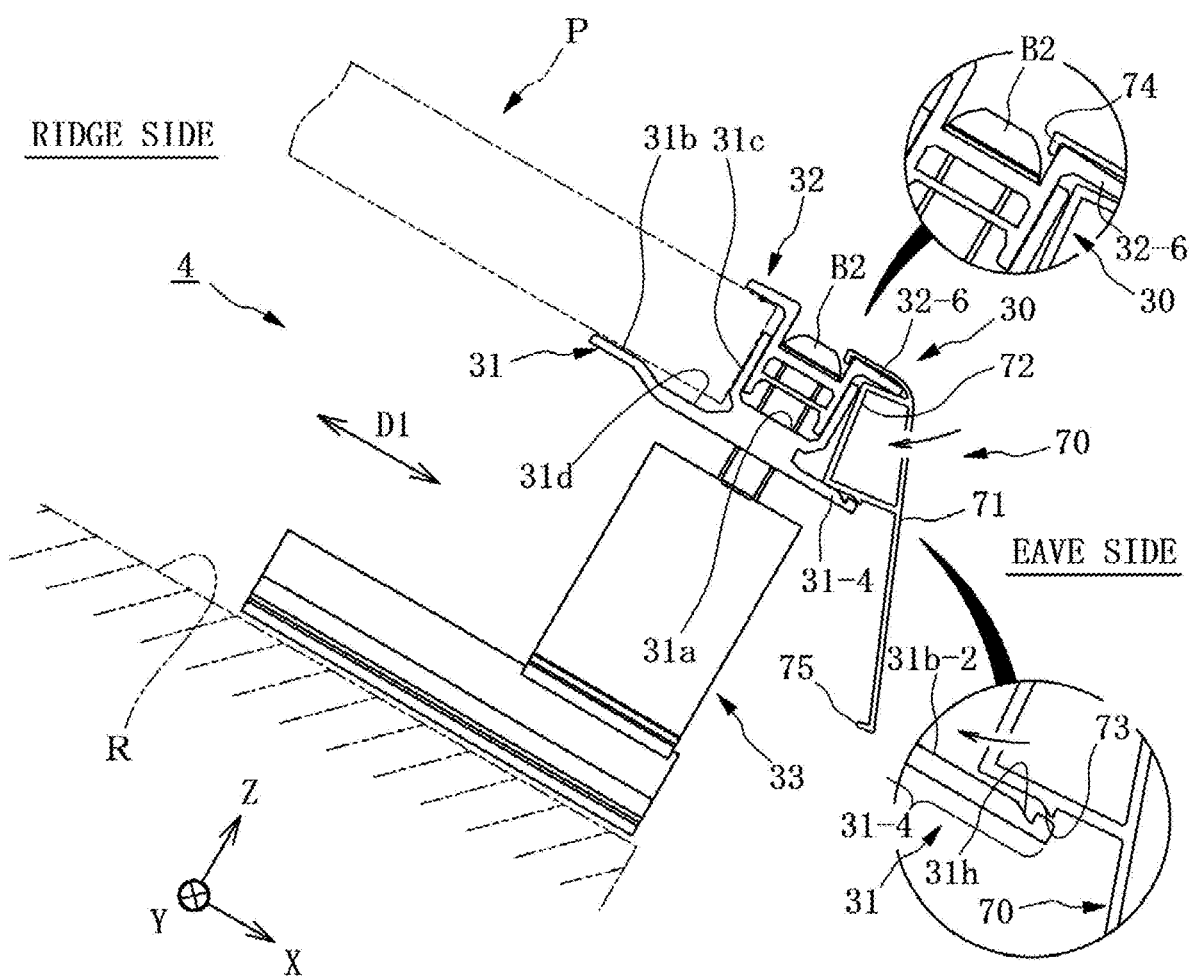
FIG. 30 is a (second) side view for explaining the attaching of the cover to the fixing unit in the trestle according to Embodiment 4.

As illustrated in FIG. 30, the engager 73 engages the engaged portion 31h formed on the mounting surface 31b-2 of the receiving member 31. The cover 70 is fixed to the fixing unit 30 due to the engager 73 engaging the engaged portion 31h.

As illustrated in FIG. 29, bends 74, 75 are formed on the cover main body 71 in the proximity of an upper end (end toward the +Z side) and a lower end (end toward the −Z side) of the cover main body 71.

The bend 74 is formed by bending a portion of the upper end of the cover main body 71 inward so as to catch on a base end portion 32-6a of the extension 32-6 of the fixing unit main body 32. The bend 74 is used together with the engager 73 to fix the cover 70 to the fixing unit 30.

The bend 75 is shaped such that a portion of the lower end of the cover main body 71 bends inward. The bend 75 is formed to enhance the strength of the lower end of the cover 70. In a case in which, for example, the bend 75 is not formed on the cover main body 71 of the cover 70, the lower end of the cover 70 is formed in a simple thin plate form and, consequently, is more likely to deform due to the application of an external force. As such, compared to a case in which the bend 75 is not formed on the cover 70, Embodiment 4 can prevent the lower end of the cover 70 from being more likely to deform due to the application of an external force. Due to the bend 75 being formed on the cover 70, the flow of aluminum, which is the material of the cover 70, can be enhanced when forming the cover 70 by extruding. For example, in a case in which the bend 75 is not formed on the cover 70, the flow of the aluminum, which is the material of the cover 70, worsens when forming the cover 70 by extruding. Due to this, the aluminum may not flow uniformly to the lower end, and forming the lower end of the cover 70 into the desired shape may not be possible. In contrast, in Embodiment 4, the bend 75 is formed on the cover 70 and, as such, an effect of distributing the aluminum, which is the material of the cover 70, up to the bend 75, which is the lower end of the cover 70, can be obtained. As a result, the Embodiment 4 can enhance the manufacturing efficiency of the cover 70.

When attaching the cover 70 configured as described above to the fixing unit 30, the user firstly hooks the bend 74 of the cover 70 on the base end portion 32-6a of the extension 32-6 of the fixing unit main body 32. Then, as illustrated in FIG. 30, the user rotates the cover 70 around the portion on which the bend 74 is hooked. As a result, the tubular portion 72 of the cover 70 is fitted between the extension 32-6 of the fixing unit main body 32 and the extension 31-4 of the receiving member 31.

When the tubular portion 72 of the cover 70 is fitted between the extensions 31-4, 32-6, the engager 73 of the cover 70 engages the engaged portion 31h formed on the extension 31-4 of the receiving member 31. As a result, the cover 70 is fixed to the fixing unit main body 32 so as not to detach from the fixing unit main body 32.

The trestle 4 according to Embodiment 4 includes the cover 70 that covers a portion of the fixing unit 30. The cover 70 covers the eave side (the +X side) of the house of the fixing unit 30. As such, the fixing unit 30 supporting the solar panel P is not exposed to the eave side (the +X side) and the aesthetic of the house on which the trestle 4 is mounted is not compromised. As a result, the trestle 4 can enhance the aesthetic.

With the trestle 4 according to Embodiment 4, the bend 74 that hooks on the fixing unit main body 32 is formed on the upper end of the cover main body 71. As such, with the trestle 4, even if, for example, snow or the like accumulates on the cover 70 and external weight is applied to the cover 70, detachment of the cover 70 from the fixing unit 30 can be suppressed.

The trestle 4 according to Embodiment 4 can demonstrate the same effects as in Embodiments 1 to 3. As such, the trestle 4 also can enhance the work efficiency when carrying out installation/removal work on the roof surface R of the house.

Note that, with the trestle 4 according to Embodiment 4, the fixing unit 30 includes a relay member 33 and, as such, the height (length in the Z-axis direction) of the fixing unit 30 is great, and the fixing unit 30 is more likely to be exposed to the eave side. Therefore, the aesthetic attributable to the covering by the cover 70 can be further enhanced. However, the present disclosure is not limited thereto. A configuration is possible in which the fixing unit 30 (see FIGS. 1 and 2) described in Embodiment 1, which does not include the relay member 33, is covered by the cover 70.

Likewise, a configuration is possible in which the fixing unit 30 (see FIG. 24) described in Embodiment 3, in which the length in the width direction (the Y-axis direction) is long, is covered by the cover 70.

Embodiment 5

In Embodiment 4, as illustrated in FIG. 29, the tubular portion 72 of the cover 70 is disposed so as to be sandwiched between the mounting surface 31b-2 of the receiving member 31 and the extension 32-6 of the fixing unit main body 32. However, the present disclosure is not limited thereto. As in Embodiment 5 illustrated in FIGS. 31 and 32, a configuration is possible in which a trestle 5 includes a spacer 80 that is fitted together with the tubular portion 72 of the cover 70 between the mounting surface 31b-2 and the extension 32-6.

In one example, the spacer 80 is formed by extruding a metal. A protrusion 81 and an engaged portion 82 are formed on the spacer 80.

The protrusion 81 is a rod-like part that protrudes in the +Y direction. The protrusion 81 is inserted into the groove 31a of the receiving member 31 of the fixing unit 30. Due to this, the spacer 80 hooks on the fixing unit 30, and the work efficiency when attaching the cover 70 to the fixing unit 30 can be enhanced.

The engaged portion 82 is a portion that the engager 73 of the cover 70 engages with instead of the engaged portion 31h formed on the receiving member 31.

Figure 33:
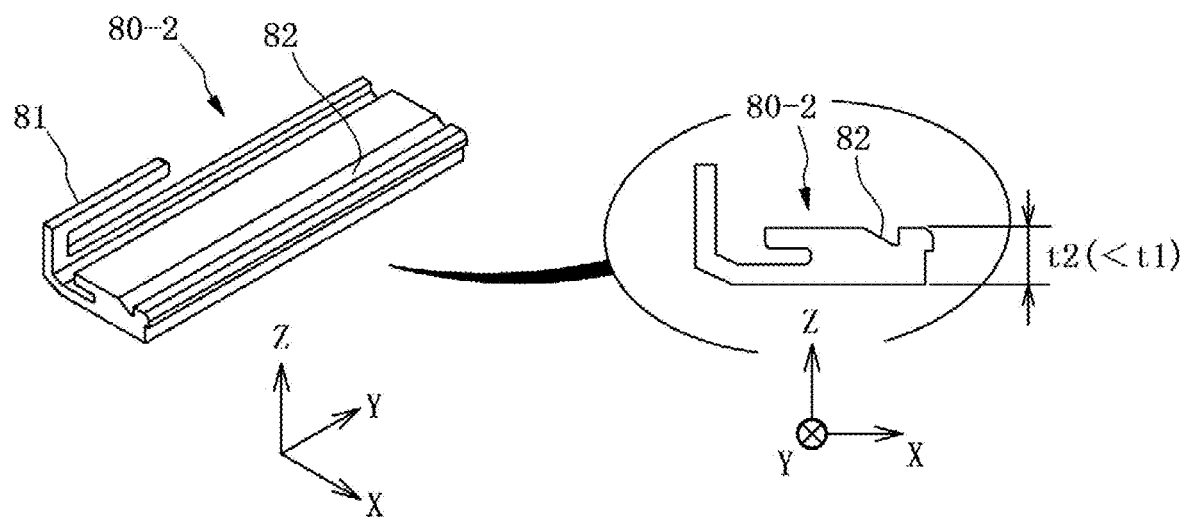
FIG. 33 is a (first) drawing of a spacer of the trestle according to Embodiment 5.
Figure 34:
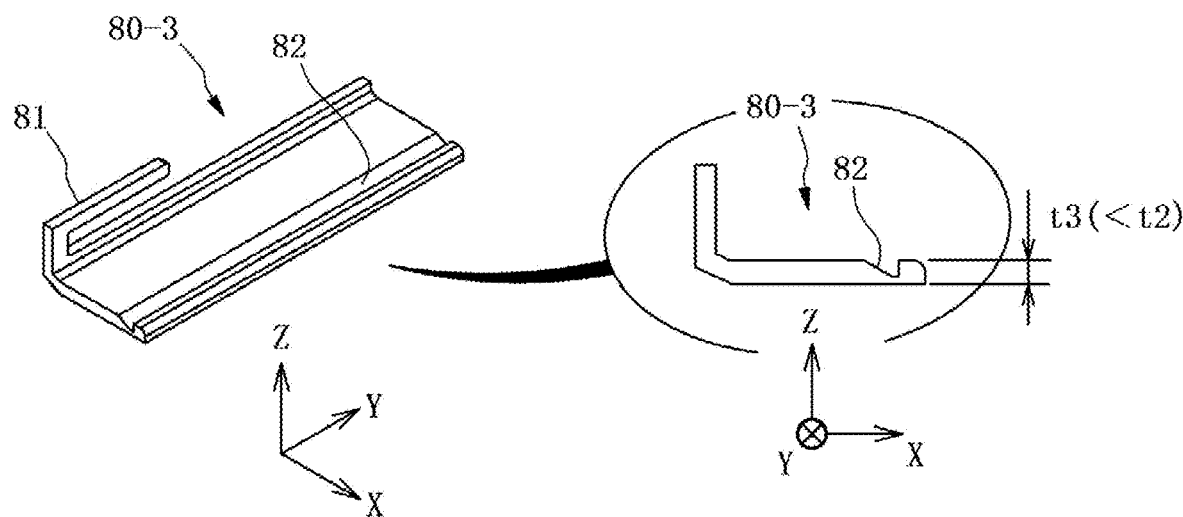
FIG. 34 is a (second) drawing of the spacer of the trestle according to Embodiment 5.

The spacer 80 is formed such that a thickness t1 (length in the Z-axis direction) thereof is substantially equal to a height obtained by subtracting a height H2 (length in the Z-axis direction) of the tubular portion 72 of the cover 70 from a height H1 between the mounting surface 31b-2 and the extension 32-6 (t1≈H1−H2). The height H1 in the Z-axis direction between the mounting surface 31b-2 and the extension 32-6 changes depending on the thickness of the solar panel P and, as such, the user can, in accordance with the thickness of the solar panel P, replace the spacer 80 with a spacer 80-2 (spacer having a thickness t2 thinner than the thickness t1) illustrated in FIG. 33, or a spacer 80-3 (spacer having a thickness t3 thinner than the thicknesses t1 and t2) illustrated in FIG. 34 that have different thicknesses.

Figure 31:
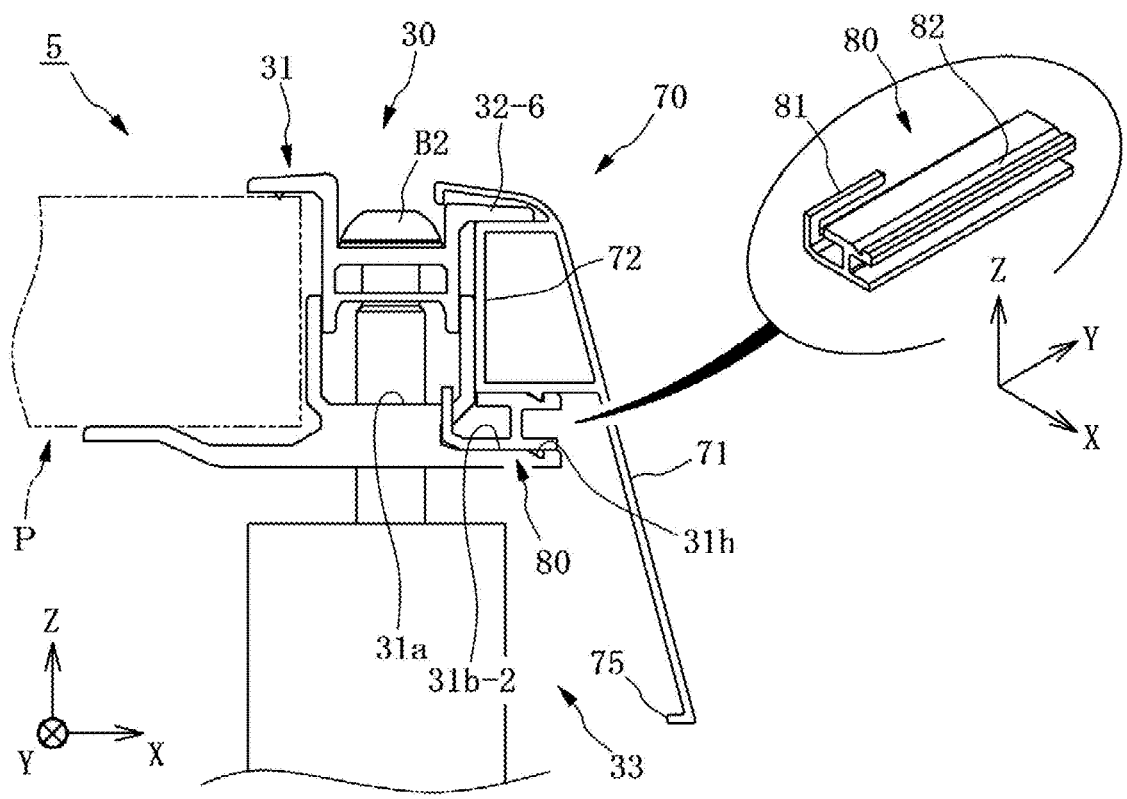
FIG. 31 is a side view of a trestle according to Embodiment 5.
Figure 32:
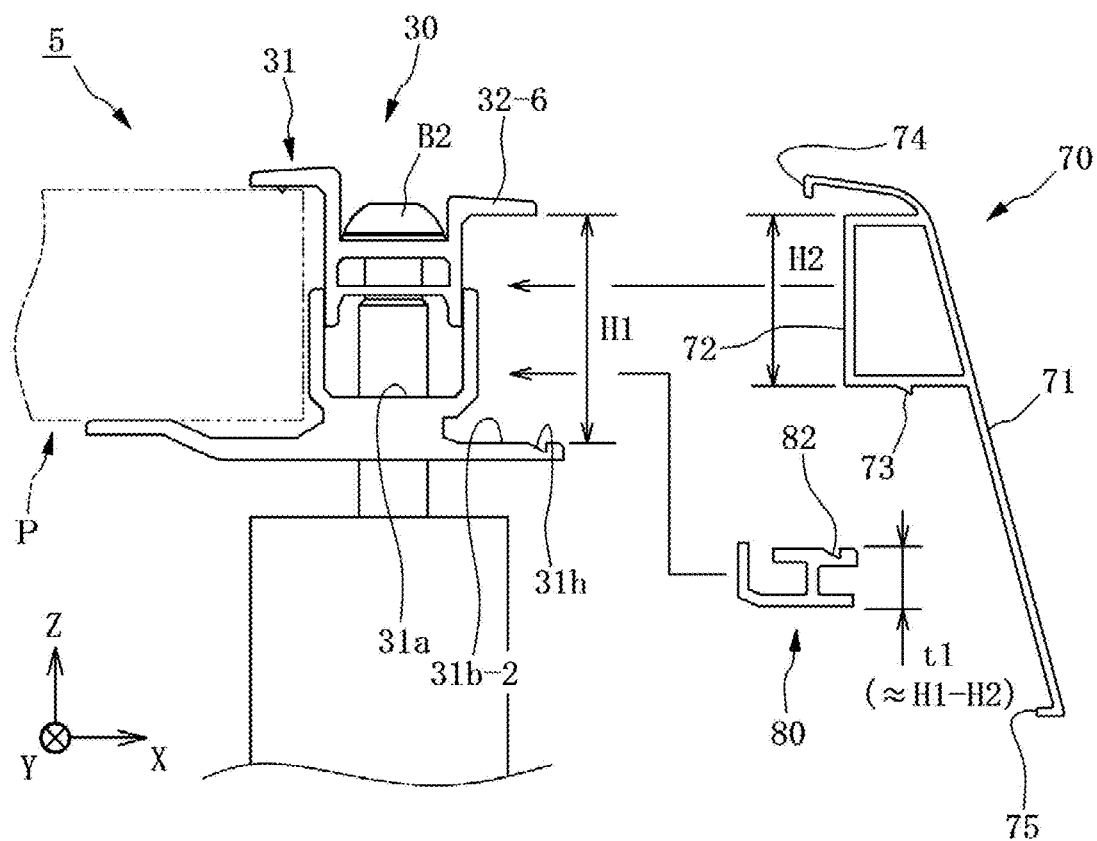
FIG. 32 is an exploded side view of the trestle according to Embodiment 5.

As illustrated in FIGS. 31 and 32, the trestle 5 according to Embodiment 5 includes the spacer 80 that can be fitted together with the tubular portion 72 of the cover 70 between the mounting surface 31b-2 and the extension 32-6. As such, it is possible to attach a cover 70 having the same shape and dimensions to the fixing unit 30, regardless of the thickness of the solar panel P. By extension, the trestle 5 can enhance the work efficiency when carrying out installation/removal work on the roof surface of the house, regardless of the thickness of the solar panel P as the installation object.

Embodiment 6

Figure 35:
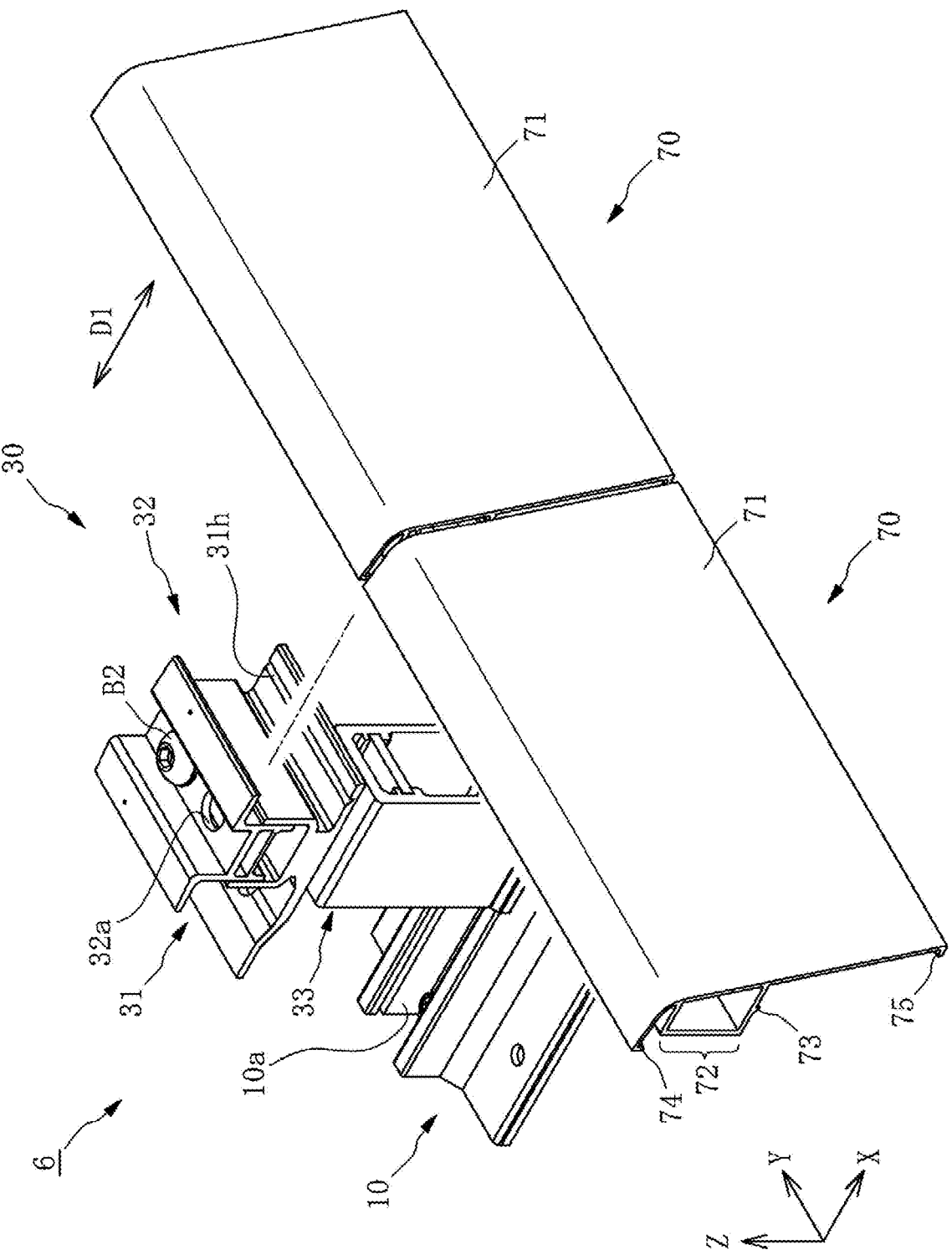
FIG. 35 is an (first) exploded perspective view of a trestle according to Embodiment 6.
Figure 36:
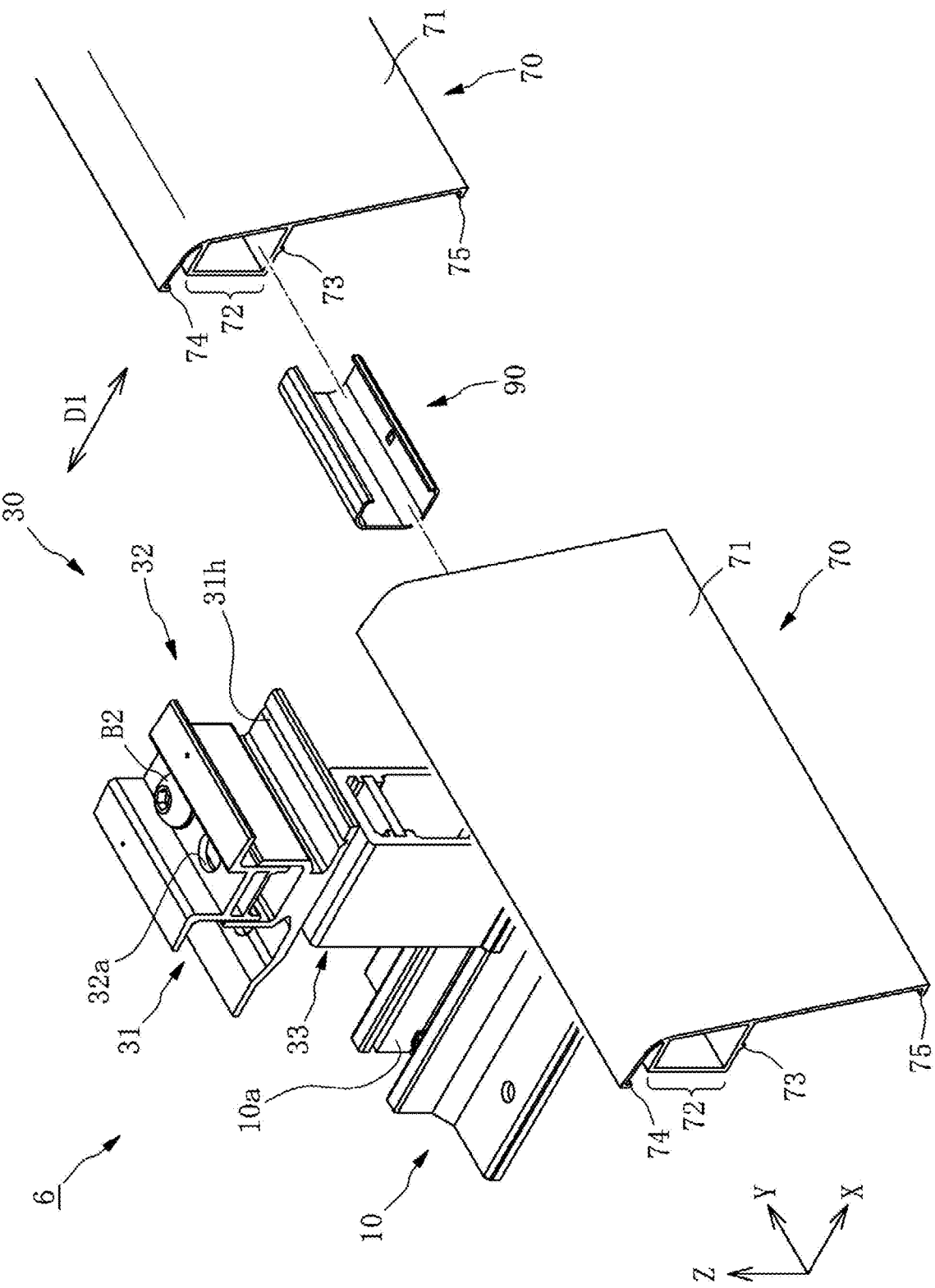
FIG. 36 is an (second) exploded perspective view of the trestle according to Embodiment 6.

In Embodiments 4 and 5, the trestles 4, 5 include one cover 70. However, the present disclosure is not limited thereto. As in Embodiment 6 illustrated in FIGS. 35 and 36, a configuration is possible in which a trestle 6 includes a plurality of covers 70. In the following, a trestle 6 according to Embodiment 6 that includes two covers 70 is described. The description focuses on the differences with Embodiments 4 and 5. With the exception of these differences, the trestle 6 according to Embodiment 6 is the same as or equivalent to the trestles 4 and 5 of Embodiments 4 and 5.

In addition to the fixing unit 30 and the like, the trestle 6 includes two covers 70, and a joint 90.

The joint 90 is constituted from an electrically conductive material. In one example, the joint 90 is formed by extruding an electrically conductive metal material. The joint 90 is formed in a shape capable of fitting in tube holes of the tubular portions 72 of the covers 70. The joint 90 is inserted into the tube holes of the tubular portions 72 to connect the two covers 70. The two covers 70 are electrically connected due to the joint 90 connecting the two covers 70. As a result, the need for a ground line between the solar panel P to be fixed by the fixing unit 30 and a separate solar panel P can be eliminated.

Embodiment 7

With the base 10 according to Embodiment 1, as illustrated in FIG. 5, the base main body 15 that includes the groove forming portion 11 and the flange portions 14R, 14L is formed in a rectangular shape in which all four corners 16 are formed at right angles. However, the present disclosure is not limited thereto. In the following, a trestle 7 according to Embodiment 7, in which the shape of the base main body 15 is different, is described using FIGS. 37 and 38. The description focuses on the differences with Embodiment 1. With the exception of these differences, the trestle 7 according to Embodiment 7 is the same as or equivalent to the trestle 1 of Embodiment 1.

Figure 37:
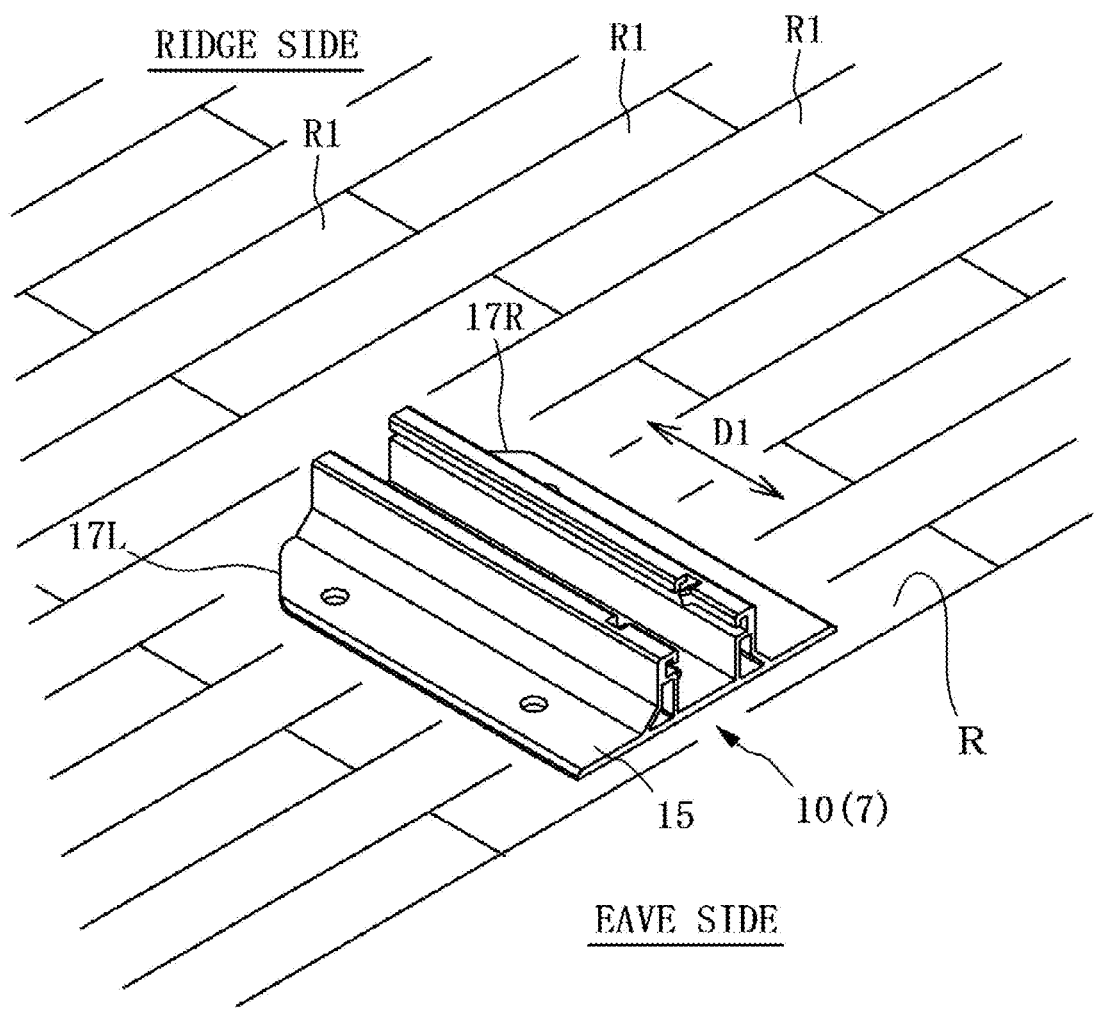
FIG. 37 is a perspective view of a trestle according to Embodiment 7.
Figure 38:
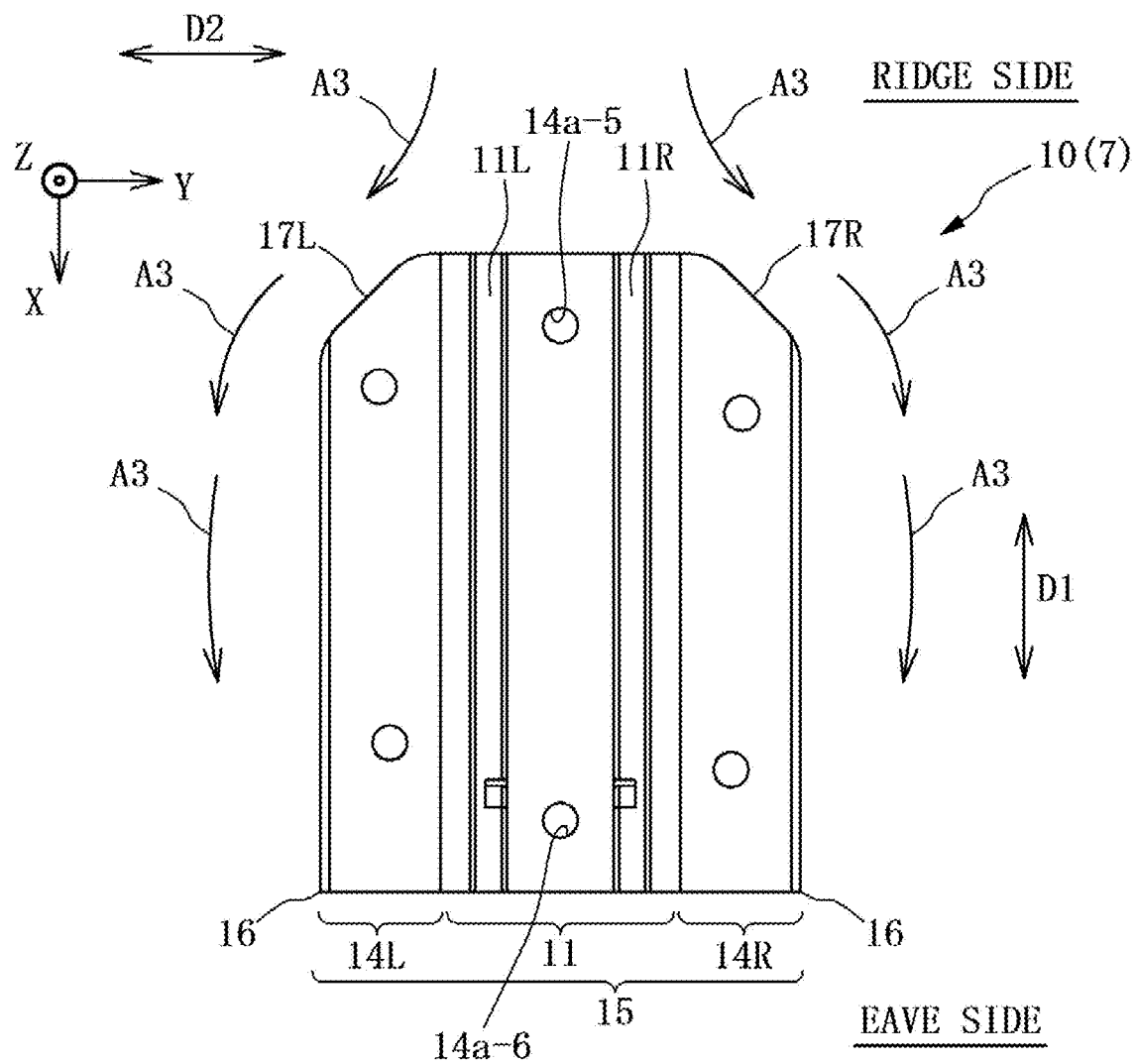
FIG. 38 is a plan view for explaining the effects of a base according to Embodiment 7.

As illustrated in FIG. 37, the base main body 15 is formed in a rectangular plate shape in which the two ridge-side corners are machined. Specifically, in this base main body 15, inclined surfaces 17R, 17L inclined with respect to the first direction D1 are formed on the corners on the ridge-side of the rectangular plate shape. In one example, the inclined surfaces 17R, 17L are formed into flat surfaces inclined with respect to the first direction D1. Due to these inclined surfaces 17R, 17L being formed, as illustrated by arrow A3 of FIG. 38, the trestle 7 according to Embodiment 7 can direct rainwater, flowing from the ridge side, in the eave direction (the +X direction), while dividing the rainwater to the left and right, namely, to the −Y side and the +Y side.

Note that, in Embodiment 7, the inclined surfaces 17R, 17L are flat surfaces. However, the present disclosure is not limited thereto. Provided that the shape is capable of directing rainwater, flowing from the ridge side, in the eave direction (the +X direction) while dividing the rainwater to the left and right, the inclined surfaces 17R, 17L may be provided with a shape other than a flat surface. For example, the inclined surfaces 17R, 17L may be formed into rounded surfaces.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

1, 2, 3, 4, 5, 6, 7 Trestle
10 Base
10a First groove
11 Groove forming portion
11R, 11L Side wall
12R, 12L Second groove
13R, 13L Slide restrictor
14R, 14L Flange portion
14a-1 Fastener insertion hole (first fastener insertion hole)
14a-2 Fastener insertion hole (second fastener insertion hole)
14a-3 Fastener insertion hole (third fastener insertion hole)
14a-4 Fastener insertion hole (fourth fastener insertion hole)
14a-5, 14a-6 Fastener insertion hole
15 Base main body
16 Corner
17R, 17L Inclined surface
20 Slide bracket (slide member)
20a Screw hole
20b Fitter
30 Fixing unit
31 Receiving member
31-1, 31-2 Side wall
31-3, 31-4 Extension (mount)
31a Groove
31b, 31b-2 Mounting surface (mount)
31c Pressure receiving surface
31d Depression
31e Hole
31f Screw hole
31g Hole
31h Engaged portion
32 Fixing unit main body
32-1, 32-2 Side wall
32-3, 32-4 Coupling plate
32-5, 32-6 Extension
32-6a Base end portion
32a, 32b Hole
33 Relay member
33a Notch
33b Rotation restrictor
33c Hole
34 Third fastener
34a Fitted hole (second fitted member)
50 Roof surface mounting fastener
60 Fitting (spacer)
70 Cover
71 Cover main body
72 Tubular portion
73 Engager
74, 75 Bend
80-2, 80-3 Spacer
81 Protrusion
82 Engaged portion
90 Joint
B1 First fastener
B1a Fitted hole (first fitted member)
B2 Second fastener
P, P-2 Solar panel (installation object)
E Edge (of solar panel P)
R Roof surface
R1 Roofing board
D1 First direction
D2 Second direction
D3 Third direction
D4 Rotation direction
D5 Direction
H Height direction
A1, A2, A3 Arrow
L1, L2 Spacing
L3, IA Straight line
H1, H2 Height
t1, t2, t3 Thickness (of spacer)

INDUSTRIAL APPLICABILITY

The present disclosure is suitable for use as a trestle that is mounted on a roof surface of a house, and that supports a solar panel installed on a surface of the roof surface.

What is claimed is:
1. A trestle, comprising:
a base that is mounted on a roof surface of a house and on which a first groove is formed along a first direction;
a slide member fitted in the first groove so as to be slidable in the first direction;
a fixing unit installed on the slide member and for fixing an installation object to be installed on a surface of the roof surface;

a first fastener for fixing the fixing unit to the slide member; and
a second fastener attached to the fixing unit, wherein
the fixing unit includes
    a receiving member on which a mount, on which the installation object is mounted, is formed, and
    a fixing unit main body that is formed capable of holding down and fixing the installation object to the mount by the second fastener, and that is fixed to the receiving member,
the first fastener is attached such that fixing between the slide member and the fixing unit can be released while maintaining the fixing between the receiving member and the fixing unit main body by the second fastener,
the first fastener is configured from a screw or a bolt that attaches to the slide member and the fixing unit by being rotated around an axis, and a first fitted member in which a tool for releasing the fixing between the slide member and the fixing unit fits is formed on a head of the first fastener,
a screw hole into which the first fastener is screwed is formed on the slide member,
a hole for insertion of the tool, wherein the hole is on the fixing unit, the hole penetrating in an axial direction of the first fastener and exposing the first fitted member to an outside,
the head of the first fastener and the first fitted member formed on the head are exposed to an outside in the axial direction through the hole, and
screwing the first fastener into the screw hole causes a portion of the base to be fixed between and in direct contact with the slide member and the fixing unit.

2. The trestle according to claim 1, wherein
the fixing unit includes a relay member that is fixed to the slide member and that is for increasing a height of the installation object with respect to the base by supporting the receiving member.

3. The trestle according to claim 2, wherein
the fixing unit includes
    a third fastener that supports the receiving member on the relay member and is configured from a member that attaches to the relay member and the receiving member by being rotated around an axis, and
the receiving member is provided liftable with respect to the relay member by the third fastener being rotated around the axis.

4. The trestle according to claim 3, wherein
a second fitted member, in which a tool for releasing the fixing between the slide member and the fixing unit fits, is formed on the third fastener, and
the second fitted member is exposed outside in at least an axial direction of the third fitted member.

5. The trestle according to claim 4, wherein
a hole or a notch that exposes the second fitted member to the outside is formed on the fixing unit main body.

6. The trestle according to claim 3, wherein
a rotation restrictor that restricts the relay member from rotating around the axis of the third fastener with respect to the base is formed on the relay member.

7. The trestle according to claim 1, wherein
a pressure receiving surface, that receives a weight of the installation object fixed by the fixing unit, is formed on the receiving member.

8. The trestle according to claim 1, wherein
a portion of the mount of the receiving member is formed recessed.

9. The trestle according to claim 1, wherein
the base includes a pair of side walls, a first groove being formed on an inner side of the pair of side walls, and
a pair of second grooves, in which a portion of the slide member is fit and that is formed along the first direction, is formed on respective opposing surfaces of the pair of side walls.

10. The trestle according to claim 9, wherein
a slide restrictor, that restricts sliding in the first direction of the slide member with respect to the base, is formed on at least one of the pair of second grooves.

11. The trestle according to claim 10, wherein
the slide restrictor is a portion formed by the second grooves being crushed due to the side walls being pressed on.

12. The trestle according to claim 1, wherein
the house is a structure including an eave, and a ridge disposed upward from the eave, and
the base includes
    a first fastener insertion hole and a second fastener insertion hole into which a roof surface mounting fixture for mounting on the roof surface is inserted, and
    a third fastener insertion hole and a fourth fastener insertion hole into which the roof surface mounting fixture is inserted and that are provided more toward the eave in an eave-ridge direction, that is a direction from the ridge toward the eave of the house, than the first fastener insertion hole and the second fastener insertion hole, and
a spacing, in a second direction orthogonal to the eave-ridge direction, between the first fastener insertion hole and the second fastener insertion hole is formed wider than a spacing between forming positions in the second direction of the third fastener insertion hole and the fourth fastener insertion hole.

13. The trestle according to claim 12, wherein
the first fastener insertion hole and the second fastener insertion hole are formed at positions such that the first groove is provided therebetween, and
the first fastener insertion hole is formed at a position more offset in the eave-ridge direction than a forming position of the second fastener insertion hole.

14. The trestle according to claim 12, wherein
the third fastener insertion hole and the fourth fastener insertion hole are formed at positions such that the first groove is provided therebetween, and
the third fastener insertion hole is formed at a position more offset in the eave-ridge direction than the forming position of the fourth fastener insertion hole.

15. The trestle according to claim 1, further comprising:
a cover covering at least a portion of the fixing unit, wherein
the house is a structure including an eave, and a ridge disposed upward from the eave, and
in the fixing unit, the cover covers an eave side in an eave-ridge direction that is a direction from the ridge to the eave of the house.

16. The trestle according to claim 1, wherein
the base includes a base main body formed in a rectangular plate shape, and
the house is a structure including an eave, and a ridge disposed upward from the eave, and
in the base main body, an inclined surface inclined with respect to the first direction is formed at corners on the ridge side of the rectangular plate shape.

* * * * *